US011773559B2

(12) United States Patent
Wendeler-Goeggelmann

(10) Patent No.: US 11,773,559 B2
(45) Date of Patent: Oct. 3, 2023

(54) PROTECTIVE DEVICE, SLOPE SECURING MEANS AS WELL AS USE OF AND METHOD FOR PRODUCING THE PROTECTIVE DEVICE

(71) Applicant: Geobrugg AG, Romanshorn (CH)

(72) Inventor: Corinna Wendeler-Goeggelmann, Herisau (CH)

(73) Assignee: Geobrugg AG, Romanshorn (CH)

(*) Notice: Subject to any disclaimer, the term of this patent is extended or adjusted under 35 U.S.C. 154(b) by 57 days.

(21) Appl. No.: 17/277,831

(22) PCT Filed: Sep. 24, 2019

(86) PCT No.: PCT/EP2019/075703
§ 371 (c)(1),
(2) Date: Mar. 19, 2021

(87) PCT Pub. No.: WO2020/064725
PCT Pub. Date: Apr. 2, 2020

(65) Prior Publication Data
US 2021/0348356 A1    Nov. 11, 2021

(30) Foreign Application Priority Data
Sep. 24, 2018 (DE) ............... 10 2018 123 477.5

(51) Int. Cl.
*E02D 17/20* (2006.01)
*D04H 3/002* (2012.01)
(Continued)

(52) U.S. Cl.
CPC ........... *E02D 17/202* (2013.01); *D04H 3/002* (2013.01); *D04H 3/011* (2013.01); *D04H 3/013* (2013.01);
(Continued)

(58) Field of Classification Search
CPC .............................. E02D 17/20; E02D 17/202
(Continued)

(56) References Cited

U.S. PATENT DOCUMENTS 5,358,356 A * 10/1994 Romanek .............. E02D 17/202
                                                            405/15
5,786,281 A *  7/1998 Prunty .................... A01G 20/20
                                                            405/15
(Continued)

FOREIGN PATENT DOCUMENTS

CA     2994440 A1    9/2018
CN   101614005 A    12/2009
(Continued)

OTHER PUBLICATIONS

Office Action dated Jan. 12, 2022, issued in corresponding Chilean Patent Application No. 697-2021 (and English Machine Translation).
(Continued)

*Primary Examiner* — Frederick L Lagman
(74) *Attorney, Agent, or Firm* — POSZ LAW GROUP, PLC

(57) ABSTRACT

A protective device, in particular an anti-erosion protective device, preferably a geotextile, is at least configured to be planarly spread over a surface, in particular an earth surface, that is to be protected, and which is at least largely implemented of a plurality of synthetic fibers interconnected via force-fit connection and/or substance-to-substance bond and arranged in such a way that they form an essentially three-dimensional structuring,
wherein at least a large portion of the synthetic fibers are at least largely biodegradable.

27 Claims, 9 Drawing Sheets

Figure 1:
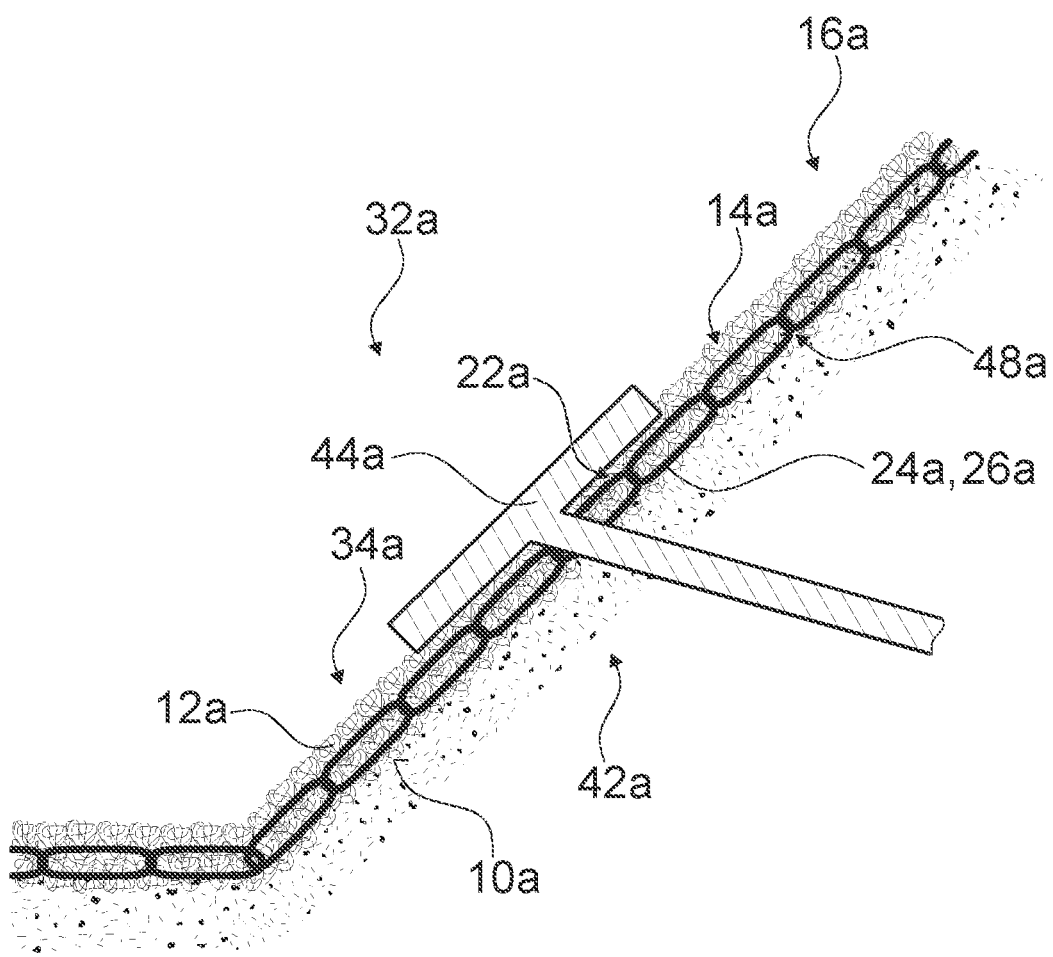

(51) Int. Cl.
  *D04H 3/011* (2012.01)
  *D04H 3/013* (2012.01)
  *D04H 3/147* (2012.01)
  *E02B 3/12* (2006.01)
(52) U.S. Cl.
  CPC ............. *D04H 3/147* (2013.01); *E02B 3/126* (2013.01); *D10B 2401/12* (2013.01); *D10B 2505/204* (2013.01); *E02D 2250/00* (2013.01); *E02D 2300/00* (2013.01); *E02D 2300/0034* (2013.01); *E02D 2300/0045* (2013.01); *E02D 2300/0054* (2013.01); *E02D 2300/0089* (2013.01)
(58) Field of Classification Search
  USPC ..................................................... 405/302.7
  See application file for complete search history.

(56) References Cited

U.S. PATENT DOCUMENTS

| | | | | |
|---|---|---|---|---|
| 6,305,875 | B1 * | 10/2001 | Matsumoto | ............ D04B 21/20 405/32 |
| 6,399,523 | B1 * | 6/2002 | Matsumoto | ............ D04B 21/20 66/196 |
| 6,855,650 | B1 * | 2/2005 | Bohannon, Jr. | ........ D04H 1/435 264/911 |
| 7,708,503 | B2 * | 5/2010 | Kohei | ..................... E02D 17/20 405/302.6 |
| 2007/0264520 | A1 | 11/2007 | Wood et al. | |
| 2010/0248574 | A1 | 9/2010 | King et al. | |
| 2013/0344759 | A1 * | 12/2013 | Roure | ..................... D04H 5/03 19/296 |

FOREIGN PATENT DOCUMENTS

| | | | |
|---|---|---|---|
| EP | 0670389 | A1 | 9/1995 |
| EP | 1160367 | A1 | 12/2001 |
| EP | 1421839 | A1 | 5/2004 |
| EP | 1424418 | A1 | 6/2004 |
| ES | 2395322 | T3 * | 2/2013 ............. E01F 9/011 |
| FR | 2767343 | A1 * | 2/1999 ............. D04B 21/12 |
| FR | 2767343 | A1 | 2/1999 |
| FR | 3032727 | A1 | 8/2016 |
| JP | H10264285 | A | 10/1998 |
| JP | H10-298997 | A | 11/1998 |
| JP | 2007-217973 | A | 8/2007 |
| JP | 2014-194157 | A | 10/2014 |
| JP | 5723468 | B2 | 5/2015 |
| JP | 2015-132163 | A | 7/2015 |
| JP | 2017-179080 | A | 10/2017 |
| JP | 3215096 | U | 3/2018 |
| KR | 1020050092956 | A | 9/2005 |
| KR | 100618279 | B1 * | 9/2006 |
| KR | 101043567 | B1 * | 6/2011 |
| KR | 101172649 | B1 * | 8/2012 ............. E01F 9/011 |
| KR | 101205552 | B1 * | 11/2012 |
| KR | 101415672 | B1 * | 7/2014 |
| KR | 20180052567 | A * | 5/2018 ............. D04B 21/12 |
| KR | 20180061812 | A * | 6/2018 |
| RU | 49011 | U1 | 11/2005 |
| RU | 114468 | U1 | 3/2012 |
| WO | 2005/023955 | A2 | 3/2005 |
| WO | 2014/114626 | A1 | 7/2014 |
| WO | 2017046648 | A1 | 3/2017 |

OTHER PUBLICATIONS

Office Action dated Feb. 28, 2022, issued in corresponding Australian Patent Application No. 2019348479.
Office Action dated Mar. 3, 2022, issued in corresponding CN Patent Application No. 201980062291.8 (and English Machine Translation).
Office Action dated May 10, 2022, issued in corresponding JP Patent Application No. 2021-516656 ( and English Machine Translation).
German Search Report dated Mar. 12, 2019, issued in corresponding German Patent Application No. 102018123477.5 (and English Machine Translation).
Navdeep Kumar et al., "Nonwoven Geotextiles from Nettle and Poly(lactic acid) Fibers for Slope Stabilization using Bioengineering Approach" Geotextiles and Geomembranes Journal, Jun. 24, 2017, 8 pages.
International Search Report dated Nov. 26, 2019, issued in corresponding International Patent Application No. PCT/EP2019/075703.
International Preliminary Report on Patentability dated Mar. 23, 2021, issued in corresponding International Patent Application No. PCT/EP2019/075703.
Office Action dated Jul. 7, 2022 in the corresponding European Patent Application No. EP 19782497.2 (and English Machine Translation).
Office Action dated May 27, 2022 in the corresponding Canadian Patent Application No. CA 3,113,872.
Examination Report dated Sep. 17, 2021, issued in corresponding RU Patent Application No. 2021109634 (and English Machine Translation).
Examination Report dated Aug. 19, 2021, issued in corresponding IN Patent Application No. 202117011517 (and English Machine Translation).
Decision of Refusal dated Oct. 25, 2022 issued in corresponding Japanese Patent Application No. 2021-516656 (and English translation).
European Examination Report dated Jul. 5, 2023 in corresponding EP application No. 19 782 497.2 (and English translation).
Third party observation of Jun. 21, 2023 in corresponding EP application No. 20190782497.
Office Action dated Aug. 8, 2023 issued in corresponding Japanese Patent Application No. 2023-019854 (and English machine translation).

* cited by examiner

PROTECTIVE DEVICE, SLOPE SECURING MEANS AS WELL AS USE OF AND METHOD FOR PRODUCING THE PROTECTIVE DEVICE

CROSS REFERENCE TO RELATED APPLICATIONS

This application is a U.S. national stage application of PCT/EP2019/075703 filed on Sep. 24, 2019, which is based on German Patent Application No. 10 2018 123 477.5 filed on Sep. 24, 2018, the contents of which are incorporated herein by reference.

STATE OF THE ART

The invention concerns a protective device according to the preamble of claim 1, a slope securing component according to some embodiments as well as a usage of the protective device according to some embodiments and a method for producing the protective device according to some embodiments.

A protective device, in particular anti-erosion protective device, preferably a geotextile, has already been proposed, which is at least configured to be planarly spread over a surface, in particular earth surface, that is to be protected, and which is at least largely implemented of a plurality of synthetic fibers interconnected via force-fit connection and/or substance-to-substance bond and arranged in such a way that they form an essentially three-dimensional structuring.

The objective of the invention is in particular to provide a generic device having advantageous weathering properties. The objective is achieved according to the invention by the features of various embodiments while advantageous implementations and further developments of the invention may be gathered from the various embodiments subclaims.

Advantages of the Invention

The invention is based on a protective device, in particular an anti-erosion protective device, preferably a geotextile, which is at least configured to be planarly spread over a surface, in particular an earth surface, that is to be protected, and which is at least largely implemented of a plurality of synthetic fibers interconnected via force-fit connection and/or substance-to-substance bond and arranged in such a way that they form an essentially three-dimensional structuring.

It is proposed that at least a large portion of the synthetic fibers are at least largely biodegradable. In this way in particular advantageous weathering properties are achievable. Advantageously the protective device weathers without residue, in particular without synthetic residues, in particular macroplastic, microplastic and/or nanoplastic residues, and/or without (heavy-) metallic residues. In this way good environment compatibility is advantageously achievable, as a result of which it is possible to achieve an especially good suitability for a usage in ecologically sensitive regions. Moreover, a high level of biocompatibility is advantageously achievable, in particular with the vegetation and/or fauna surrounding the protective device. For example, damaging of plants and/or animals incorporating fibers of the protective device may be kept at an advantageously low level. In particular, at least a large portion of the synthetic fibers belonging to the plurality of synthetic fibers are at least largely biodegradable.

The protective device is in particular configured for a protection of a sloping terrain, in particular for an embankment securing and/or slope securing, for example in civil engineering, hydraulic construction and/or road construction and/or preferably in the context of geotechnical safeguarding structures. In particular, the protective device is configured for a usage in the context of construction activities in the field of bioengineering. Alternatively or additionally, the protective device is configured to facilitate and/or enable a seeding of vegetation and/or a re-seeding of a terrain, in particular a sloping terrain. In particular, the protective device, preferably at least the large portion of the plurality of synthetic fibers of the protective device, is configured to have completely disappeared, in particular completely rotted, after a time period that is predeterminable, in particular depending on a chemical composition of the synthetic fibers, for example after one, two, three or more vegetation periods. For example, a protective device intended for a quick re-seeding of a terrain with a fertile topsoil layer comprises quickly decomposing synthetic fibers, which will in particular have almost completely rotted after one or two growth periods. As an alternative, for example, a protective device intended for a terrain with poor, barren, for example stony or very steeply sloping, soils will be implemented such that it rots slowly and is decomposed only after several, e. g. four, five, six or more growth periods. Advantageously a decomposition time of the synthetic fibers is adjustable and/or adaptable to weather conditions which are to be expected by way of an adjustment of the chemical composition of the fiber material, in particular of the synthetic material or the synthetic mixture. The protective device, in particular the geotextile, is in particular embodied as a slope mat and/or as a spike mat.

By the protective device being "implemented largely of a plurality of synthetic fibers which are interconnected by force-fit connection and/or substance-to-substance bond" is in particular to be understood that a large portion of a number of all individual parts of the protective device, in particular with the exception of wire filaments of a wire netting of the protective device, are synthetic fibers. "Largely" is to mean in particular 51%, preferably 66%, advantageously 75%, especially advantageously 85%, preferentially 95% and particularly preferentially 99%. Preferably, with the exception of the wire netting, the protective device is completely implemented of the plurality of synthetic fibers which are interconnected by force-fit connection and/or substance-to-substance bond. "Interconnected by substance-to-substance bond" is in particular to mean that the mass particles are held together by atomic or molecular forces, like for example by soldering, welding, gluing, melting and/or vulcanization. "Interconnected by force-fit connection" is here in particular meant to describe a releasable connection, wherein a holding force between two structural components is preferably transferred by a geometrical engagement of the structural components into one another and/or by a friction force between the structural components.

By a "synthetic fiber" is in particular a fiber to be understood which consists of macromolecules whose principal and/or basic chemical component is at least one synthetically or semi-synthetically produced polymer with organic groups or regenerated cellulose. Preferably the synthetic fiber is a polymer fiber, preferentially a synthesis fiber and/or a regenerate fiber, preferably a viscose fiber.

In particular, a synthetic fiber forms an extruded monofilament. In particular, in comparison to geotextiles made of natural fibers, e. g. jute, reed and/or coconut fibers, a biodegradability, i. e. a velocity of the biological decomposability, may advantageously be adjustable by a selection of the chemical composition of the biodegradable synthetic fiber. Moreover, with biodegradable synthetic fibers it is advantageously possible to set further material characteristics by the selection of the chemical composition, e. g. stretchability, tear resistance, elasticity, deformability, or the like. Synthetic fibers are furthermore advantageously less susceptible regarding an infestation with mold fungi that could affect a re-seeding. Advantageously the synthetic fibers have a low water absorbency, which also in particular reduces a risk of an infestation with mold fungi. In particular, the synthetic fibers have at least substantially identical cross sections and/or diameters. Alternatively, the synthetic fibers may have varying cross sections and/or diameters. Preferably a synthetic fiber of the plurality of synthetic fibers has a round cross section and/or a diameter of at least 0.1 mm, preferably at least 0.2 mm, advantageously at least 0.3 mm, especially advantageously at least 0.4 mm, preferentially at least 0.6 mm, and particularly preferentially no more than 1.5 mm. The diameter of the biodegradable synthetic fiber is preferably 0.4 mm. In particular, at least a portion of the synthetic fibers are implemented as continuous fibers, preferably all synthetic fibers are implemented as continuous fibers.

Alternatively or additionally, in particular at least a portion of the synthetic fibers is implemented as staple fibers and preferably all synthetic fibers are implemented as staple fibers.

By the synthetic fibers forming an "essentially three-dimensional structuring" is in particular to be understood that individual synthetic fibers of the plurality of synthetic fibers are/can be oriented in different directions comprising all three spatial directions, and/or that the synthetic fibers have, in particular at least partly and/or section-wise, an orientation in a direction perpendicularly to the planar spreading direction of the protective device. In particular, the protective device is structured three-dimensionally. In particular, the protective device is a planarly spreadable, three-dimensional textile. By way of its three-dimensional structuring, the protective device preferably has an extension perpendicularly to the planar spreading direction, in particular a thickness, which is greater than a 10-fold, preferably than a 15-fold, advantageously than a 20-fold, especially advantageously than a 30-fold, preferentially than a 50-fold of an average diameter of the synthetic fibers, and is particularly preferably smaller than a 500-fold of an average diameter of the synthetic fibers. The three-dimensional structuring in particular comprises hollow spaces. In particular, the protective device is not opaque. Alternatively, it is however also conceivable that the three-dimensional structuring is free of hollow spaces and/or is implemented opaque. In particular, the three-dimensional structuring of synthetic fibers has a pyramid-like superstructure. In particular, the pyramid-like superstructure forms a grid-like arrangement of at least substantially pyramid-shaped elevations and at least substantially pyramid-shaped hollows. As a result, with the three-dimensional structuring of synthetic fibers lying upon a surface, advantageously a surface friction with the surface can be increased. Preferably the protective device is water-permeable. In particular, individual synthetic fibers are implemented as full bodies, which are preferably free of further materials beyond the biodegradable synthetic material/s and possible additives for a controlling of the biodegradability. Alternatively, at least a portion of the synthetic fibers may form a core-shell structure, in which a core formed of at least one differing material, e. g. a natural fiber like a coconut or jute fiber, is enveloped by a shell made of a biodegradable synthetic material. Such a core-shell structure advantageously permits a controlling of an absorptive capacity of the natural fibers for liquids.

The three-dimensional structuring is in particular configured such that when seeding takes place plant seeds get caught in the structure, thus staying put even on a sloping terrain, and being in particular not washed away by rain or the like. Moreover, seeds caught in the three-dimensional structuring are advantageously provided with good germinating conditions, in particular as they are protected from conditions too wet and/or too dry for a successful germination, for example as the seeds can be kept away from too wet ground, e. g. puddles, thus preventing putrescence, and may at the same time be supplied with a sufficient amount of humidity by dew formation on the large surfaces of the synthetic fibers, which furthers the germination. Beyond this the three-dimensional structuring advantageously supports a streambed stabilization, in particular as the three-dimensional structuring provides the protective device with an advantageously high degree of slide friction.

By "at least a large portion of the synthetic fibers being biodegradable" is in particular to be understood that a large portion of the synthetic fibers are implemented of a biodegradable synthetic material. Preferentially all synthetic fibers are biodegradable. By a synthetic fiber being "largely biodegradable" is in particular to be understood that a large portion of the material of the synthetic fiber is biodegradable. Preferably the synthetic fibers are completely biodegradable. In particular, the synthetic fibers are free of oxo-degradable synthetic materials. In particular, the biodegradable synthetic fibers are free of polyethylene, polyvinylchloride and/or polypropylene.

"Biodegradable" is in particular to mean biologically degradable and/or biologically decomposable. In particular, a biodegradable synthetic fiber is configured to decompose to a large extent into carbon dioxide ($CO_2$) and sievable residue of low, preferably neglectable, ecotoxicity within an environmentally compliant period. Preferentially, within the environmentally compliant period the organic fractions of the synthetic fiber are decomposed into $CO_2$ by at least 90%. In particular, a decomposition of the biodegradable synthetic fibers is effected at least largely by microorganisms. In particular, a decomposition of the biodegradable synthetic fiber results in a preferably complete conversion of the biodegradable synthetic fiber into $CO_2$ and/or biomass. Preferentially, after the environmentally compliant period, of the residue of the synthetic fiber not converted into $CO_2$ 90% are sievable through a sieve having a maximum sieve hole diameter of 2 mm. The environmentally compliant period is in particular at least 6 months, preferably at least 12 months, advantageously at least 2 years, preferentially at least 3 years and especially preferentially at least 5 years. Furthermore, the environmentally compliant period is in particular maximally 35 years, preferably no more than 25 years, advantageously no more than 15 years, preferentially maximally 10 years and especially preferentially no more than 5 years. In particular, the residues of the synthetic fiber contain no concentrations of the elements zinc, copper, nickel, cadmium, lead, mercury, chromium, molybdenum, selenium, arsenic and fluor or only small concentrations of the elements mentioned, which do not exceed the limits set in the standard DIN EN 13432:2000. Preferably, in particular in contrast to residues of polyvinylchloride, residues of the synthetic fiber do not comprise any concentrations of hydrogen chloride. In particular, the synthetic fibers do not create any negative effect onto a natural composting process. In particular, test fibers implemented identically to the synthetic fibers fulfill at least the above-described conditions regarding ecotoxicity, sievability and conversion into $CO_2$ within the environmentally compliant period if said test fibers are subjected to a test trial under the composting conditions given in the standard DIN EN ISO 14855:2004-10. Preferably the biodegradable synthetic fibers are produced at least largely, preferably completely, of bio-based, in particular non-fossil, raw materials. In particular, the biodegradable synthetic fibers can be completely metabolized into biomass by organisms, in particular microorganisms.

"Configured" is in particular to mean specifically programmed, designed and/or equipped. By an object being configured for a certain function is in particular to be understood that the object fulfills and/or executes said certain function in at least one application state and/or operation state.

If at least a portion of the synthetic fibers are implemented at least partially of a polylactide synthetic material (PLA), a protective device having advantageous weathering properties is advantageously achievable. In particular, the PLA synthetic material advantageously presents an at least substantially neutral carbon footprint as it is advantageously producible of renewable raw materials, which in particular allows avoiding negative effects onto the climate, and thus onto the frequency of weather extremes. Furthermore, fibers made of a PLA synthetic material advantageously have an especially stable, in particular constant, tensile strength even after significant weathering. Advantageously, fibers made of a PLA synthetic material are hydrophobic. Advantageously, fibers made of a PLA synthetic material are spinnable and/or extrudable. Advantageously, fibers made of a PLA synthetic material are difficult to ignite. With a density of 72.06 $gmol^{-1}$, fibers made of a PLA synthetic material have an advantageously low weight, which permits a total weight of the protective device to be kept at an advantageously low level. Preferably all synthetic fibers are implemented at least partly of a PLA synthetic material. It is conceivable that at least a portion of the synthetic fibers or all synthetic fibers are implemented completely of a PLA synthetic material.

If moreover at least a portion of the synthetic fibers are implemented at least partially, in particular completely, of a biodegradable synthetic material which differs from a polylactide synthetic material, in particular of a polyhydroxy butyric acid (in German: PHBV), a polycaprolactone (PCL), a polybutylene succinate (PBS) and/or a polybutylene adipate-terephthalate (PBAT), advantageously a protective device having advantageous weathering properties is achievable, in particular as at least one characteristic of the protective device, for example the tensile strength, the stretchability, and/or the compostability, and/or a degree, respectively a velocity, by which the characteristic changes during the weathering can be set, can be adapted to conditions which are to be expected and/or can be optimized. For example, a portion of the synthetic fibers may be implemented of a PLA synthetic material and another portion of the synthetic fibers may be implemented of the biodegradable synthetic material different than the PLA synthetic material. The resulting protective device is in particular realized as a mixture of synthetic fibers which are made of at least two different biodegradable synthetic materials and which are interconnected by force-fit connection and/or by substance-to-substance bond. This advantageously enables characteristics of different biodegradable synthetic materials to be combined.

It is furthermore proposed that at least a portion, preferably a large portion, of the synthetic fibers are implemented at least partially, preferably completely, of a spinnable blend of at least two, in particular precisely two, biodegradable synthetic materials. This in particular allows achieving a protective device with advantageous weathering properties. In particular, in this way it is in particular possible to adapt and/or optimize at least one characteristic of the protective device, in particular a material characteristic of the synthetic fibers of the protective device, e. g. the tensile strength, the stretchability and/or the compostability, and/or to adapt and/or a degree, respectively a velocity, by which the characteristic, in particular the material characteristic, changes during the weathering, to conditions which are to be expected. In this way in particular characteristics of different biodegradable synthetic materials can be advantageously combined in a synthetic fiber, thus in particular achieving an optimized protective device having the new characteristics.

The term "spinnable" is in particular to mean extrudable. A spinnable synthetic material and/or a spinnable blend may in particular be brought into a shape of a longitudinal element, preferably a monofilament, having a longitudinal extension which is greater than a maximum transverse extension that runs perpendicularly to the longitudinal extension at least by a factor of 10, preferably at least by a factor of 50 and preferentially at least by a factor of 100. A "blend" is in particular to mean a polymer blend, preferably a mixable polymer blend or a compatible polymer blend, which in particular constitutes a purely physical mixture of at least two synthetic materials, in particular biodegradable materials. In particular, the blend is realized as a PLA+PCL blend, a PLA+PBAT blend, a PLA+PHBV blend or preferably as a PLA+PBS blend.

If at least one component of the spinnable blend is realized as a polylactide synthetic material, wherein a volume percentage of the polylactide synthetic material of the synthetic fibers implemented of the spinnable blend is at least 40%, preferably at least 50%, advantageously at least 60%, particularly advantageously at least 70% and preferentially no more than 80%, advantageous material characteristics are achievable. Particularly preferably the volume percentage of the PLA synthetic materials of all the synthetic fibers is between 50% and 60%. It is in particular advantageously possible to combine a relatively high tensile strength of the PLA synthetic material with a relatively high stretchability of a PBAT synthetic material or a PBS synthetic material. Advantageously, in this way a biodegradable synthetic fiber is achievable, which has a higher tensile strength than pure PBAT synthetic fibers, than pure PBS synthetic fibers or than pure PCL synthetic fibers, and which in particular has a higher stretchability than pure PLA synthetic fibers. In particular, the blend is realized as a PLA+PCL blend with a mixing ratio of 80:20, as a PLA+PBAT blend with a mixing ratio of 50:50, as a PLA+PBAT blend with a mixing ratio of 60:40, as a PLA+PBS blend with a mixing ratio of 50:50 or preferably as a PLA+PBS blend with a mixing ratio of 60:40. Alternatively further mixing ratios and/or further combinations of biodegradable synthetic materials are conceivable.

Beyond this it is proposed that at least a large portion of the synthetic fibers, in particular at least the biodegradable synthetic fibers, are thermoplastically deformable. In this way easy modelability of the synthetic fibers, in particular of the protective device, can be facilitated, thus advantageously enabling a particularly complex three-dimensional structuring of the synthetic fibers, which are interconnected by force-fit connection and/or by substance-to-substance bond. Moreover, for a production of the protective device in particular a substance-to-substance bond between individual synthetic fibers is advantageously achievable. In particular, the synthetic fibers are thermoplastically deformable at temperatures above 150° C., preferably above 160° C., advantageously above 180° C., preferentially above 200° C. and especially preferentially below 220° C. In particular, a thermoplastic deformability is a sufficient condition for a good extrudability.

If at least a portion of the synthetic fibers are implemented as viscose fibers and/or as regenerate cellulose fibers, a protective device having advantageous weathering properties is advantageously achievable. In particular, the viscose fibers and/or the regenerate cellulose fibers advantageously present an at least substantially neutral carbon footprint as they are advantageously obtainable from renewable raw materials, thus in particular avoiding negative effects onto the climate, and thus onto a frequency of weather extremes. Furthermore, this advantageously allows achieving especially good holding of plant seeds dispersed over the protective device, in particular the protective device with the nonwoven structure, as in particular the regenerate fibers, preferably the viscose fibers, are capable of swelling with water, while advantageously producing something like a glue, which is configured for holding the plant seeds. In particular, the viscose fiber may also be realized as a modal fiber, as a lyocell fiber or as a cuprammonium fiber.

It is further proposed that the synthetic fibers form an, in particular three-dimensional, preferably monofilament, random-fiber fabric, preferably having hollow spaces between a large portion of the synthetic fibers. Advantageously, in this way an especially good seedability is achievable, in particular as plant seeds find favorable conditions, in particular humidity conditions, for germination in the hollow spaces of the monofilament random-fiber fabric. Advantageously plant seeds get easily caught in the monofilament random-fiber fabric. The monofilament random-fiber fabric in particular forms a three-dimensional random nonwoven material. The monofilament random-fiber fabric in particular has a monofilament random-fiber fabric structure. The monofilament random-fiber fabric structure in particular enables a simple three-dimensional structuring. Furthermore, a beneficial water and light permeability of the protective device and in particular a low total weight of the protective device are advantageously achievable by the monofilament random-fiber fabric structure with its plurality of hollow spaces. Moreover, due to the monofilament random-fiber fabric structure, advantageously fine matter of slope material, for example small stones and/or small earth lumps, cannot pass the protective device and is in particular retained. The fine matter advantageously gets wedged in the monofilament random-fiber fabric structure. This advantageously allows further improving a retaining effect. The monofilament random-fiber fabric structure is in particular implemented of a plurality of synthetic fibers which form monofilaments extending without order, in particular randomly, in all directions. The synthetic fibers of the monofilament random-fiber fabric structure are several times bent and/or kinked. The monofilament random-fiber fabric structure in particular reminds of dried Asian instant noodles. In particular, in intersection points of the monofilament random-fiber fabric structure, individual monofilaments of the monofilament random-fiber fabric are (thermoplastically) interconnected, in particular melted with one another.

Additionally or alternatively, it is proposed that the synthetic fibers, in particular the regenerate fibers, preferably the viscose fibers, realize a nonwoven-material-like structure, which forms a three-dimensionally structured, closed, in particular flexible surface plane. This advantageously allows achieving a geotextile with a separating and/or filtering function between an upper side and an underside of the geotextile. In particular, the closed surface plane has an at least substantially egg-carton-like three-dimensional structuring. In particular, the egg-carton-like three-dimensional structuring comprises hollows and elevations which are arranged regularly or irregularly with respect to one another. Preferably the hollows and elevations form the pyramid-like superstructure.

If the protective device comprises a wire netting, a favorable protective effect, in particular a good anti-erosion protective effect, is advantageously achievable. The protective device with the wire netting advantageously has a high strength and/or stability. Advantageously the wire netting is configured for a retaining of the soil and/or the rock, respectively stones, of the terrain that is to be protected. In this way a high level of security is advantageously achievable. In particular, the wire netting has a regular mesh shape. Alternatively, the mesh shape of individual meshes may differ from other meshes and/or the wire netting may have an irregular mesh shape. In particular, the wire netting has an, in particular regular, rhomboid mesh shape. This advantageously allows securely holding up even small lumps of stone. Alternatively, the wire netting may have a different mesh shape, for example a square mesh shape, a hexagonal mesh shape, and/or a round mesh shape. In particular, the wire of the wire netting has a thickness that is, for example, approximately 1 mm, approximately 2 mm, approximately 3 mm, approximately 4 mm, approximately 5 mm, approximately 6 mm, approximately 7 mm or even more or even less, or also a diameter having a value in-between. Furthermore, greater, in particular significantly greater, diameters are conceivable if the longitudinal element comprises a plurality of components, in particular a plurality of wires, like for example in case of a wire rope or a strand or a wire bundle, or the like. In particular, the wire of the wire netting comprises a corrosion protection layer, for example a zinc layer applied via hot-dip galvanization, an Al/Zn corrosion protection layer, an Al/Zn/Mg corrosion protection layer, or the like. Alternatively, the wire is implemented of rust-resistant and/or non-rusting steel. In particular, the corrosion protection layer has a mass per unit area of at least 110 $g/m^2$, preferably at least 150 $g/m^2$, preferentially at least 200 $g/m^2$ and especially preferentially at least 250 $g/m^2$. In particular, the wire netting has a planar implementation. In particular, the wire netting has a main extension plane that extends at least substantially parallel to a main extension plane of the random-fiber fabric and/or of the nonwoven-material-like structure. Preferably the wire netting extends at least over a large portion of a total planar extension of the protective device. Preferentially the wire netting extends completely over the total planar extension of the protective device. By a "main extension plane" of a structural unit is in particular a plane to be understood which is parallel to a largest side face of a smallest imaginary rectangular cuboid just still completely enclosing the structural unit, and which in particular extends through the center point of the rectangular cuboid. "Substantially parallel" is here in particular meant to define an orientation of a direction relative to a reference direction, in particular in a plane, wherein the direction differs from the reference direction in particular by less than 8°, advantageously by less than 5° and especially advantageously by less than 2°.

Moreover, it is proposed that the wire netting is implemented at least of helix-shaped longitudinal elements which are braided with one another. In this way, in particular an advantageously structured wire netting is producible. Such a wire netting advantageously has a high tensile strength. Advantageously such a wire netting is implemented such that it can be wound up with the protective device, in particular the random-fiber fabric or the nonwoven-material-like structure. In this way, a mounting and/or a transport can be advantageously facilitated. In particular, a longitudinal element has a longitudinal extension that is greater than a maximum transverse extension running perpendicularly to the longitudinal extension at least by a factor of 10, preferably at least by a factor of 50, and preferably at least by a factor of 100. In particular, at least one of the helix-shaped longitudinal elements, preferably all helix-shaped longitudinal elements, is/are manufactured at least of a single wire, a wire bundle, a wire strand, a wire rope and/or another longitudinal element with at least one wire. A "wire" is in particular to mean, in this context, an elongate and/or thin and/or at least machine-wise bendable and/or flexible body. Advantageously the wire has along its longitudinal direction an at least substantially constant, in particular circle-shaped or elliptic cross section. Especially advantageously the wire is embodied as a round wire. It is however also conceivable that the wire is implemented, at least section-wise or completely, as a flat wire, a square wire, a polygonal wire and/or a profile wire.

In particular, the longitudinal elements have a shape of a flat, in particular flat-pressed, spiral. The helix-shaped longitudinal elements in particular have at least one first leg, at least one second leg and at least one bending region connecting the first leg and the second leg to each other. Advantageously neighboring helix-shaped longitudinal elements, which are braided with one another, are connected via their bending regions. Especially advantageously respectively two bending regions of different helix-shaped longitudinal elements are connected with each other, in particular hooked into each other. In particular, the helix-shaped longitudinal elements of the wire netting have the same rotation direction. Advantageously respectively two helix-shaped longitudinal elements are knotted with each other, in particular respectively at a first one of their ends and/or respectively at a second one of their ends, which is situated opposite the first ends.

In particular, the helix-shaped longitudinal elements, which are braided with one another, are entwined with one another. Preferably the longitudinal direction of the helix-shaped longitudinal elements is oriented at least substantially parallel or parallel to a main extension direction of the helix-shaped longitudinal elements. Preferably the main extension plane of the helix is arranged at least substantially parallel to a main extension plane of the wire netting, at least in a planarly laid out and/or planarly rolled-out state of the wire netting, which may in particular differ from an installed state of the wire netting. By a "main extension direction" of an object is herein in particular a direction to be understood which extends parallel to a longest edge of a smallest geometrical rectangular cuboid just still completely enclosing the object.

Beyond this it is proposed that the wire netting is, in particular at least two-sidedly, braided with the synthetic fibers. In this way in particular an advantageous combination of a synthetic fiber structure, in particular the random-fiber fabric, preferably the spike mat and/or the nonwoven-material-like structure, can be enabled. Advantageously the wire netting and the synthetic fiber structure, in particular the random-fiber fabric, the spike mat and/or the nonwoven-material-like structure, can be laid in a single work step. This advantageously permits simplification of a mounting. Moreover, a permanent securing of a sloping terrain, in particular an embankment, is advantageously achievable, even after a biological decomposition of the synthetic fibers. In particular, this allows combining the advantages of easy seeding and high security. In particular, the wire netting and the synthetic fiber structure, in particular the random-fiber fabric, the spike mat and/or the nonwoven-like structure, are connected such that a destruction-free separation is not possible. The term "such that a destruction-free separation is not possible" is in particular to mean not separable from each other without damaging. The term "braided with the synthetic fibers" is in particular to mean that the wire netting has been worked into the random structure of synthetic fibers which are interconnected by substance-to-substance bond and/or that the wire netting is surrounded on at least two sides, preferably on all sides, by the synthetic fibers which are interconnected by substance-to-substance bond. In particular, the wire netting forms something like a support netting for a randomly arranged three-dimensional netting, which is implemented of the synthetic fibers and surrounds the wire netting.

It is also proposed that at least a portion of the synthetic fibers are connected with the wire netting by substance-to-substance bond. In this way advantageously a particularly stable combination of wire netting and synthetic fibers is achievable.

Moreover, it is proposed that the wire netting has a three-dimensional, mattress-like structure. In this way a high flexibility of the protective device, in particular of the wire netting, is achievable in regard to a load in a load direction that is perpendicular to the main extension plane of the wire netting. For example, this advantageously makes the protective device walkable and/or within limits drivable, in particular during mounting. The three-dimensional, mattress-like structure furthermore advantageously allows augmenting a friction, in particular a toothing, with a surface structure of the terrain. This advantageously results in an improvement of a stabilization of the terrain, in particular in a further reduction of an erosion. By way of the three-dimensional, mattress-like structure of the wire netting, it is further possible to advantageously support a spanning height of the three-dimensional structuring implemented by synthetic fibers, in particular of the three-dimensional random-fiber fabric, such that in particular a flattening of the three-dimensional structuring, in particular the random-fiber fabric, of an installed protective device over time can be kept at a preferably low level. By a "mattress-like structure" is in particular a three-dimensional planar structure to be understood which has a cushioning capacity in a direction that is perpendicular to the planar extension of the structure.

If the wire netting comprises at least one wire that is implemented at least partly of a high-tensile steel, in particular with a tensile strength of at least 500 N/mm$^2$, preferably at least 750 N/mm$^2$, advantageously at least 1000 N/mm$^2$, especially advantageously at least 1770 N/mm$^2$, preferentially at least 2500 N/mm$^2$, and particularly preferentially no more than 3000 N/mm$^2$, an especially high stability of the protective device is advantageously achievable. In particular, this makes a high level of security achievable.

In addition it is proposed that in at least one tension test trial at least one test fiber piece of at least one, in particular at least substantially non-weathered and/or at least substantially as-good-as-new synthetic fiber of the protective device, in particular at least one test fiber bundle piece of a fiber bundle of the protective device, presents a strength that is greater than 70 MPa, preferably greater than 80 MPa, preferentially greater than 90 MPa and especially preferentially greater than 100 MPa. In this way a high, in particular initial, robustness of the protective device is advantageously achievable. This advantageously enables easy mounting and seeding, in particular by the protective device being walkable and/or to a certain degree drivable, in particular during mounting and/or during seeding. Moreover, in this way a particularly good retaining capacity is achievable, which is in particular better than a retaining capacity of customary erosion protection mats implemented, for example, of jute or coconut fiber. In particular, the test fiber piece, in particular the test fiber bundle piece, is at least substantially identical to a synthetic fiber of the protective device, in particular to a bundle of synthetic fibers of the protective device. Preferentially, "substantially identical" is to mean identical except for manufacturing tolerances and/or in the limits of manufacturing-technological possibilities. In particular, the test fiber piece is embodied in a one-part implementation. Preferably the test fiber bundle piece comprises at least 10, preferably at least 20 synthetic fibers wherein, if the protective device comprises different kinds of fibers, the composition of the test fiber bundle piece corresponds to an average composition of the synthetic fibers of the protective device. In particular, the test fiber piece is straight. In particular, the test fiber piece and/or the test fiber bundle piece has a length of at least 1 cm, preferably at least 2 cm, preferentially at least 10 cm and maximally 20 cm. In particular, in the tension test trial the test fiber piece and/or the test bundle piece is respectively clamped with its ends in a tension test device by means of clamping jaws, wherein the clamping jaws are moved apart from each other in the tension test trial. In particular, in the tension test trial the clamping jaws are moved apart from each other with a velocity of 20 mm/min and the respective forces arising at the clamping jaws are measured until the test fiber piece and/or the test fiber bundle piece breaks. The resulting strength is in particular equivalent to the maximum force which relatively acts onto a cross section area of the test fiber piece and/or of the test fiber bundle piece and which is borne by the test fiber piece and/or the test fiber bundle piece without breaking. Preferably the strength is meant as an average strength, wherein in particular at least a statistic of ten individual measurements is required for a determination of the average strength. "Substantially as good as new" is in particular to mean free of previous damaging by UV light, humidity and tensile load. By a "strength" of a test fiber piece and/or of a test fiber bundle piece is in particular a tensile strength of the test fiber piece and/or of the test fiber bundle piece to be understood.

It is further proposed that when the test fiber piece, in particular the test fiber bundle piece, has gone through an at least 500-hour, in particular standardized, radiation and weathering test in a weathering chamber, in which the test fiber piece, in particular the test fiber bundle piece, has been subjected, at least cyclically, at least to a UV-light radiation and at least to a weathering by spray water, the test fiber piece, in particular the test fiber bundle piece, presents in the tension test trial a remaining strength of at least 66%, preferably at least 75 5, advantageously at least 85%, preferentially at least 90% and especially preferentially no more than 95% of an initial strength of the test fiber piece, in particular the test fiber bundle piece, in a non-weathered, in particular at least substantially as-good-as-new state. In this way a high level of security of the protective device is advantageously achievable, in particular during a first vegetation period following an installation of the protective device. Moreover, an unprotected storage at an installation location before and/or during mounting may thus be permitted for a limited time. An "initial strength" is in particular to mean a strength following a production of a synthetic fiber and/or a strength before a weathering of the synthetic fiber.

In particular, the radiation and/or weathering test comprises at least a sequence of radiation and weathering cycles, during which the test fiber piece, in particular the test fiber bundle piece, is exposed to predetermined environment conditions. A radiation and weathering cycle has a duration of in particular 120 min. During an execution of the radiation and weathering test in particular the radiation and weathering cycles are repeated without pause. The 500-hour radiation and weathering test in particular comprises a sequence of 250 at least substantially identical radiation and weathering cycles. A radiation and weathering cycle in particular comprises a, preferably continuous, irradiation with UV light in a wavelength range between 300 nm and 400 nm with an irradiation intensity of 60 $W/m^2$±2 $W/m^2$, preferably by a xenon lamp having respective filters for a simulation of daylight UV radiation. Each radiation and weathering cycle further comprises an 18-minute spray phase, during which the test fiber piece, in particular the test fiber bundle piece, is exposed to spraying with spray water, and a 102-minute drying phase, during which the test fiber piece, in particular the test fiber bundle piece, is free of spraying with spray water. In particular, a weathering chamber temperature is, preferably constant, 38° C.±3° C. during the execution of the radiation and weathering test in the weathering chamber. In particular, a relative humidity within the weathering chamber is, preferably constant, 50%±10% during the execution of the radiation and weathering test. In particular, a black standard temperature of the test fiber piece, in particular the test fiber bundle piece, within the weathering chamber is, preferably constant, 65° C.±3° C. during the execution of the radiation and weathering test. The course of the radiation and weathering test preferentially follows the conditions of Cycle 1 of Procedure A according to the standard DIN EN ISO 4892-2:2013-06.

Furthermore, it is proposed that in at least one expansion test trial at least one test fiber piece of at least one, in particular at least substantially non-weathered and/or at least substantially as-good-as-new, synthetic fiber of the protective device, in particular at least one test fiber bundle piece of a fiber bundle of the protective device, has a stretchability above 500%, preferably above 600%. In this way a high, in particular initial, flexibility, in particular elasticity, of the protective device is advantageously achievable. This advantageously enables easy mounting and seeding, in particular if the protective device is walkable and/or within limits drivable, in particular during mounting and/or during seeding. It is moreover advantageously possible to achieve a favorable shape-wise adaptability of the protective device to unevenness of ground. In particular, in the expansion test trial the test fiber piece or the test fiber bundle piece is respectively clamped at its ends in an expansion test device by clamping jaws, wherein the clamping jaws are moved apart from each other in the expansion test trial. The expansion test device is preferably implemented identically to the tension test device. Preferentially the tension test device is configured, besides the execution of the tension test trial, also for an execution of the expansion test trial, and vice versa. In particular, in the expansion test trial the clamping jaws are moved apart from each other with a velocity of 20 mm/min and the respective length changes of the test fiber piece or of the test fiber bundle piece are measured until the test fiber piece and/or the test fiber bundle piece breaks apart. The resulting stretchability is in particular the maximum length change sustained by the test fiber piece and/or the test fiber bundle piece without breaking.

Preferably the stretchability is to be understood as an average stretchability wherein, in particular, for a determination of an average stretchability at least a statistic of ten individual measurements is required.

If, having gone through an at least 500-hour, in particular standardized, radiation and weathering test in a weathering chamber, in which the test fiber piece, in particular the test fiber bundle piece, is exposed at least cyclically at least to a UV-light radiation and at least to a weathering by water, the test fiber piece, in particular the test fiber bundle piece, presents in the expansion test trial a remaining stretchability of at least 50%, preferably at least 66%, advantageously at least 75%, especially advantageously at least 85%, preferentially at least 90% and particularly preferentially at least 95% of an initial stretchability of the test fiber piece, in particular the test fiber bundle piece, in a non-weathered, in particular as-good-as-new state, advantageously a re-workability of an installed protective device can be enabled, for example for a re-seeding, for which the protective device must be walked over once more. Moreover, in this way advantageously an unprotected storage at a location of installation, before and/or during mounting, may be permitted for a limited period. An "initial stretchability" is in particular to mean a stretchability after production of a synthetic fiber and/or a stretchability prior to a weathering of the synthetic fiber.

It is also proposed that in at least one composting test carried out on at least one test fiber piece of at least one at least partially biodegradable synthetic fiber of the protective device, in particular on at least one test fiber bundle piece of an at least partially biodegradable fiber bundle of the protective device, at least 10%, preferentially at least 30%, advantageously at least 50%, preferably at least 70% and particularly preferably at least 90% of the test fiber piece, in particular the test fiber bundle piece, have biologically decomposed and in particular disintegrated after a period of 2 years, in particular 4 years, preferably 6 years and preferentially 8 years. In this way in particular advantageous weathering characteristics are achievable. It is advantageously possible that a good environmental compatibility is achieved, thus advantageously enabling an especially good suitability for a usage in ecologically sensitive regions. In particular, a biodegradability is adaptable to environmental conditions which are to be expected at an installation location and/or adaptable to intended usages of the protective device. In particular, the biodegradability is adjustable by adding small quantities of additives which increase or reduce the biodegradability. For example, synthetic fibers for a protective device configured for a seeding and/or re-seeding of a surface are advantageously quickly biologically decomposable and are at least largely decomposed after maximally 2 years, with a large portion of a decomposition preferably taking place in the second service year of the protective device. Alternatively, for example, synthetic fibers for a protective device configured mainly for anti-erosion protection without re-seeding will be longer durable, with biological decomposition occurring later, such that after 5 years, in particular 8 years, preferably 10 years, at least a large portion of the biodegradable synthetic fibers will be still there. In particular, the composting test is realized in a test composting installation under controlled composting conditions. Preferentially the composting test is realized under the composting conditions given in the standard DIN EN ISO 14855:2004-10. The controlled composting conditions in particular comprise a mixing of the biodegradable synthetic fibers with an inoculum, which is preferably implemented as a well-aired compost from an aerobic composting installation and is at least substantially free of large inert objects. The biodegradable synthetic fibers are herein in particular comminuted such that an entire surface area of individual pieces of synthetic fibers is smaller than 2 cm by 2 cm. A ratio of total dry matter to the whole inoculum of the composting test is in particular between 5:10 and 5.5:10. A ratio of organic dry matter to the entire inoculum of the composting test is in particular less than 1.5:10. A ratio of organic dry matter to the entire dry matter of the composting test is in particular less than 3:10. A pH value of a mixture made up of one part inoculum and five parts deionized water is in particular between 7.0 and 9.0. An activity of the inoculum of the composting test is in particular implemented such that a biologically decomposable reference material, for example a TLC cellulose reference film with a particle size that is smaller than 20 μm, outgasses within 10 days between 50 mg and 150 mg $CO_2$ per gram of organic dry matter. In particular, the mixture of inoculum and biodegradable synthetic fibers is subjected to the composting test in a vessel of the test composting installation, which has an inner volume of at least 3 l, wherein the vessel is filled by at least two thirds with the mixture of inoculum and biodegradable synthetic fibers. The filled vessel of the test composting installation is in particular exposed to a constant temperature of 58° C.±2° C. and a water-saturated, at least substantially $CO_2$-free atmosphere. During the composting test the vessel of the test composting installation is shaken once a week. A water percentage of the mixture of inoculum and the biodegradable synthetic fibers is in particular at least substantially constant at 50%. A pH value of the mixture of inoculum and the biodegradable synthetic fibers is in particular between 7.0 and 9.0 during the whole composting test.

It is also proposed that, in the composting test carried out on at least one test fiber piece of at least one at least partially biodegradable synthetic fiber of the protective device, in particular on at least one test fiber bundle piece of an at least partially biodegradable fiber bundle of the protective device, maximally 10%, preferably maximally 15%, advantageously maximally 20% and preferentially maximally 30% of the test fiber piece, in particular of the test fiber bundle piece, have biologically decomposed after a period of 0.5 years, preferably 2 years, advantageously 4 years, especially advantageously 6 years, preferentially 8 years and especially preferentially 10 years. In this way a high level of stability and/or security of the protective device during the first vegetation period is advantageously achievable. Moreover, a good support of vegetation taking root is advantageously enabled during the first vegetation period. Beyond this an anti-erosion protection by the synthetic fibers can advantageously be maintained at least as long as there is not yet sufficient vegetation contributing to the anti-erosion protection, which means at least over the first vegetation period.

Furthermore, a slope securing with the protective device is proposed. This advantageously allows providing a slope securing with a high environmental compatibility.

Beyond this, a usage of the protective device with a seeding and/or a re-seeding of an, in particular slope-situated and/or erosion-prone, surface, in particular earth surface, is proposed. In this way in particular an efficient seeding can be enabled, in particular by advantageous germination conditions and/or by advantageously preventing distributed seeds from being washed out with heavy rains.

Moreover, a method for producing the protective device is proposed in which in at least one structuring step synthetic fibers, which are initially implemented separately from one another and which are at least largely biodegradable, are connected to one another by force-fit connection and/or by substance-to-substance bond, in particular by a heating of the synthetic fibers, such that the at least largely biodegradable synthetic fibers form a mat-like, in particular spike-mat-like, structure, preferably a monofilament random-fiber fabric structure, with an essentially three-dimensional structuring. In this way in particular a protective device having the above-mentioned advantageous characteristics can be produced.

It is further proposed that, in at least one further method step that precedes the structuring step, the at least largely biodegradable, randomly oriented synthetic fibers are arranged layer-wise above and underneath a wire netting, such that in the structuring step the wire netting is braided with the synthetic fibers. In this way it is in particular possible to produce a protective device with the above-mentioned advantageous characteristics, which is advantageously additionally reinforced by a wire netting.

The protective device according to the invention, the slope securing according to the invention, the usage of the protective device according to the invention and/or the method for producing the protective device according to the invention are herein not to be limited to the application and implementation described above. In particular, in order to fulfill a functionality that is described here, the protective device according to the invention, the slope securing according to the invention, the usage of the protective device according to the invention and/or the method for producing the protective device according to the invention may comprise a number of individual elements, structural components and units that differs from a number given here.

DRAWINGS

Further advantages will become apparent from the following description of the drawings. In the drawings two exemplary embodiments of the invention are illustrated. The drawings, the description and the claims contain a plurality of features in combination. Someone skilled in the art will purposefully also consider the features separately and will find further expedient combinations.

Figure 2:
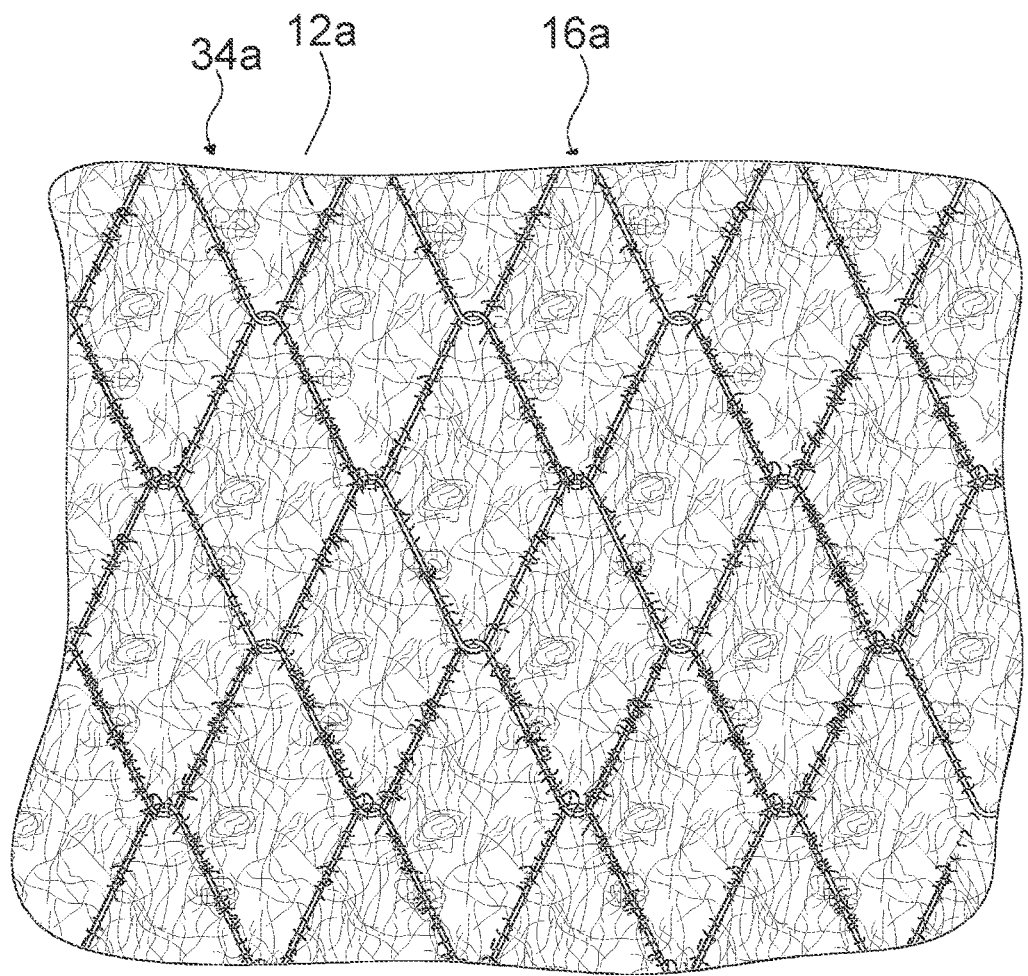
Figure 3:
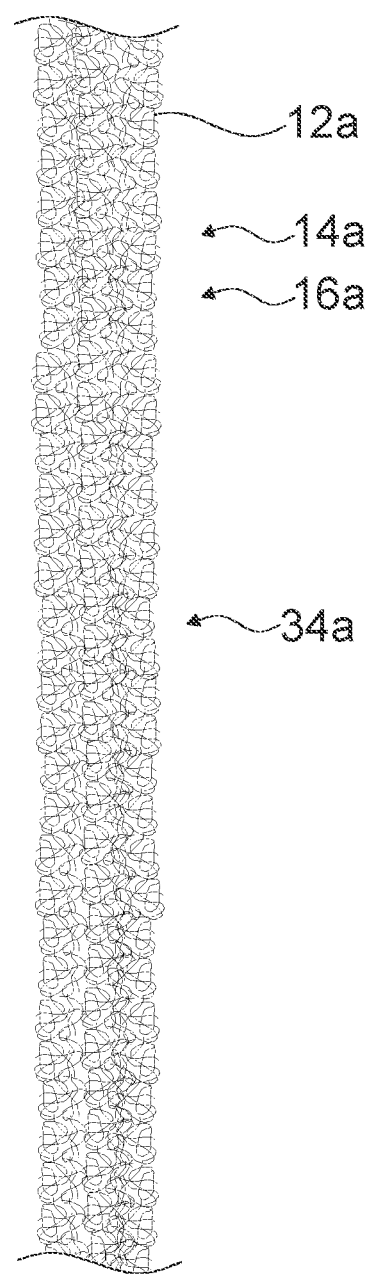
Figure 4:
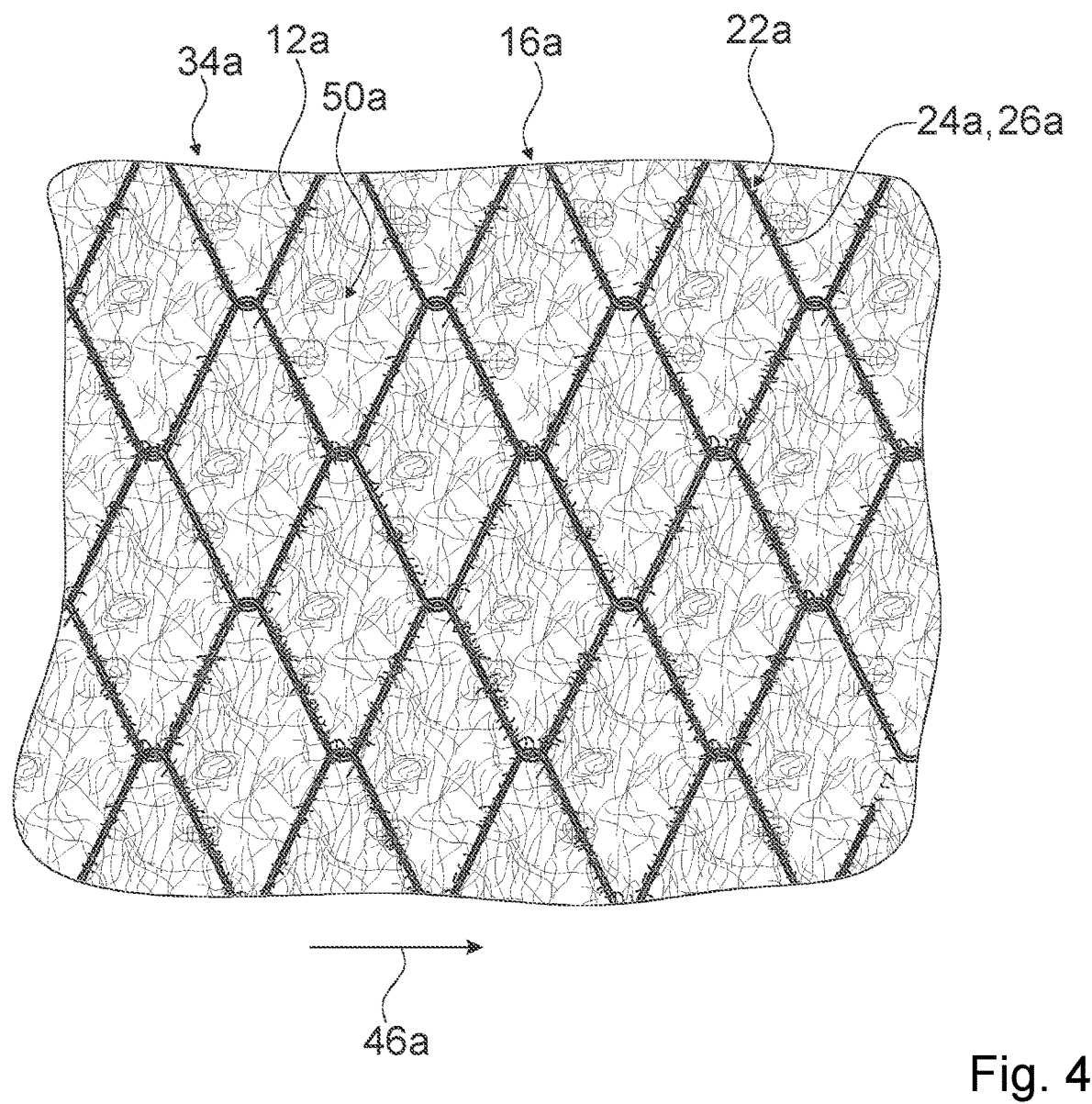
Figure 5:
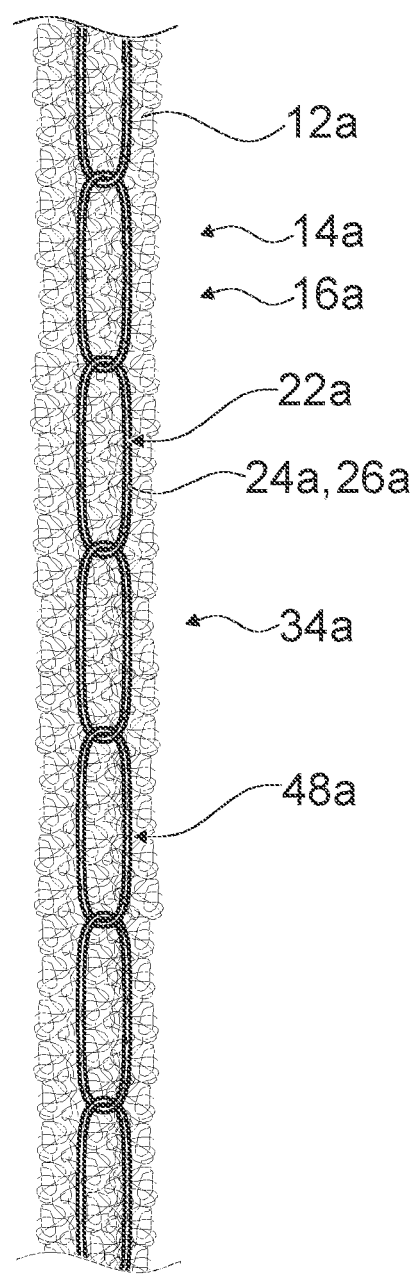
Figure 6:
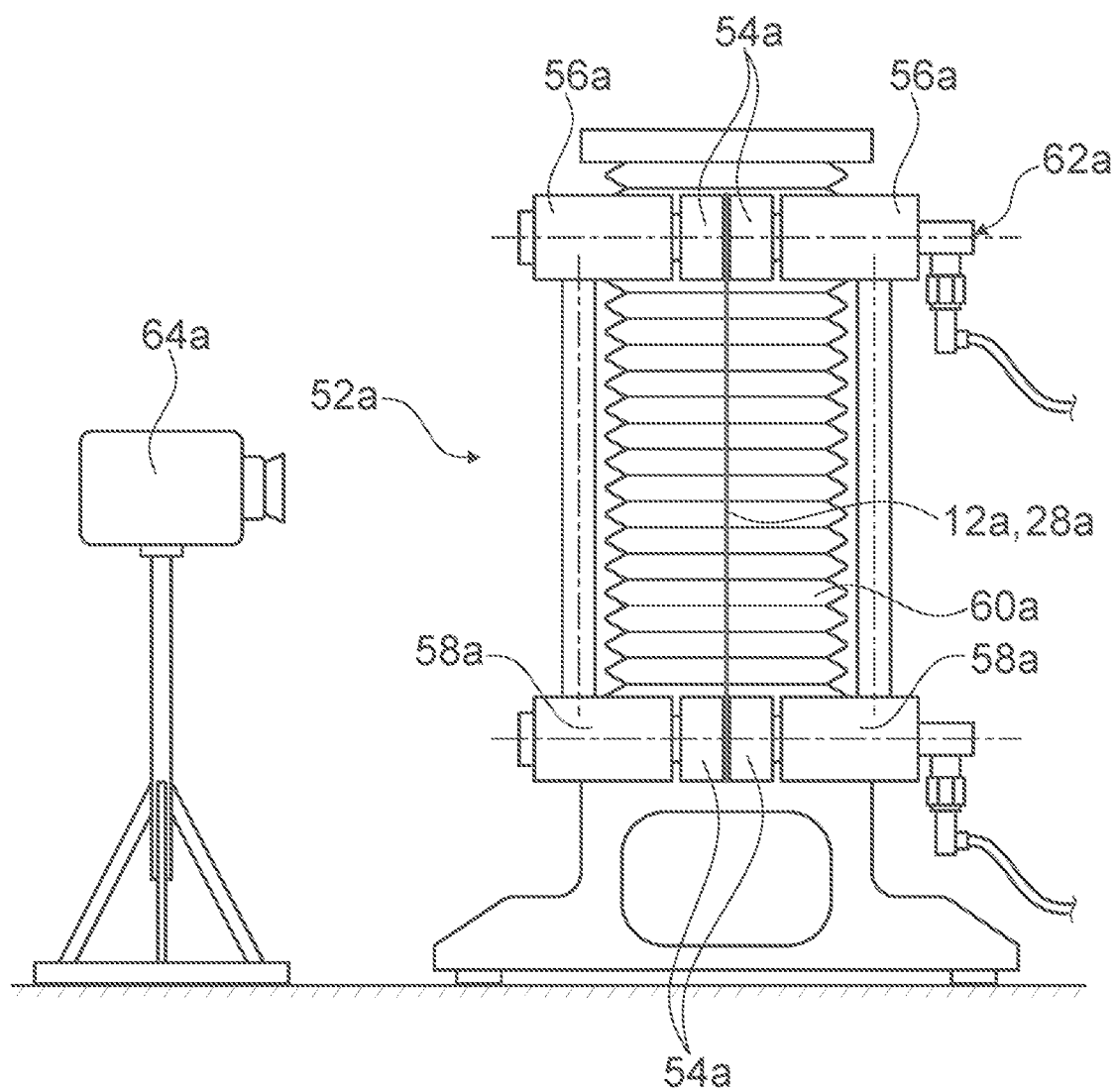
Figure 7:
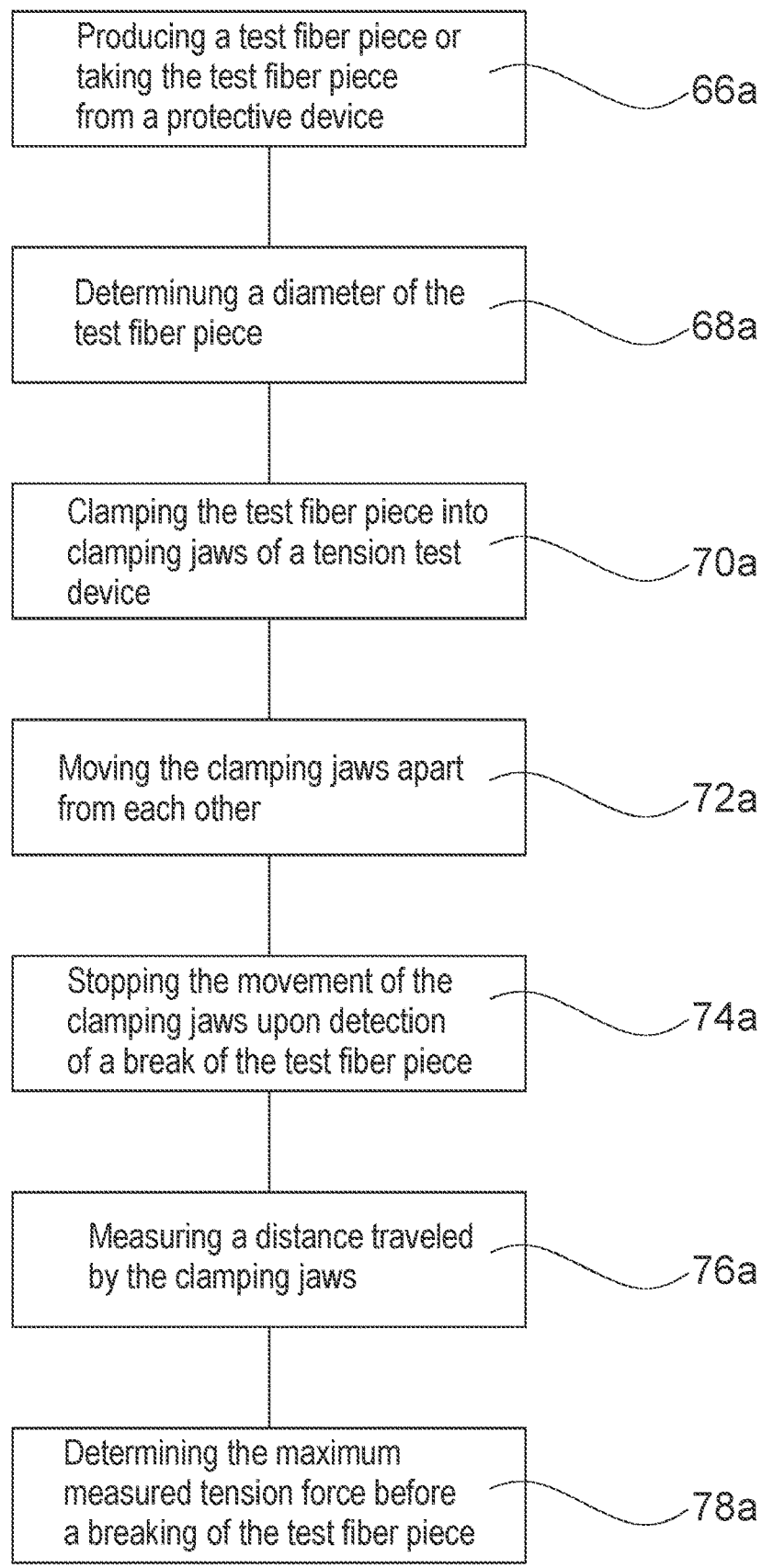
Figure 8:
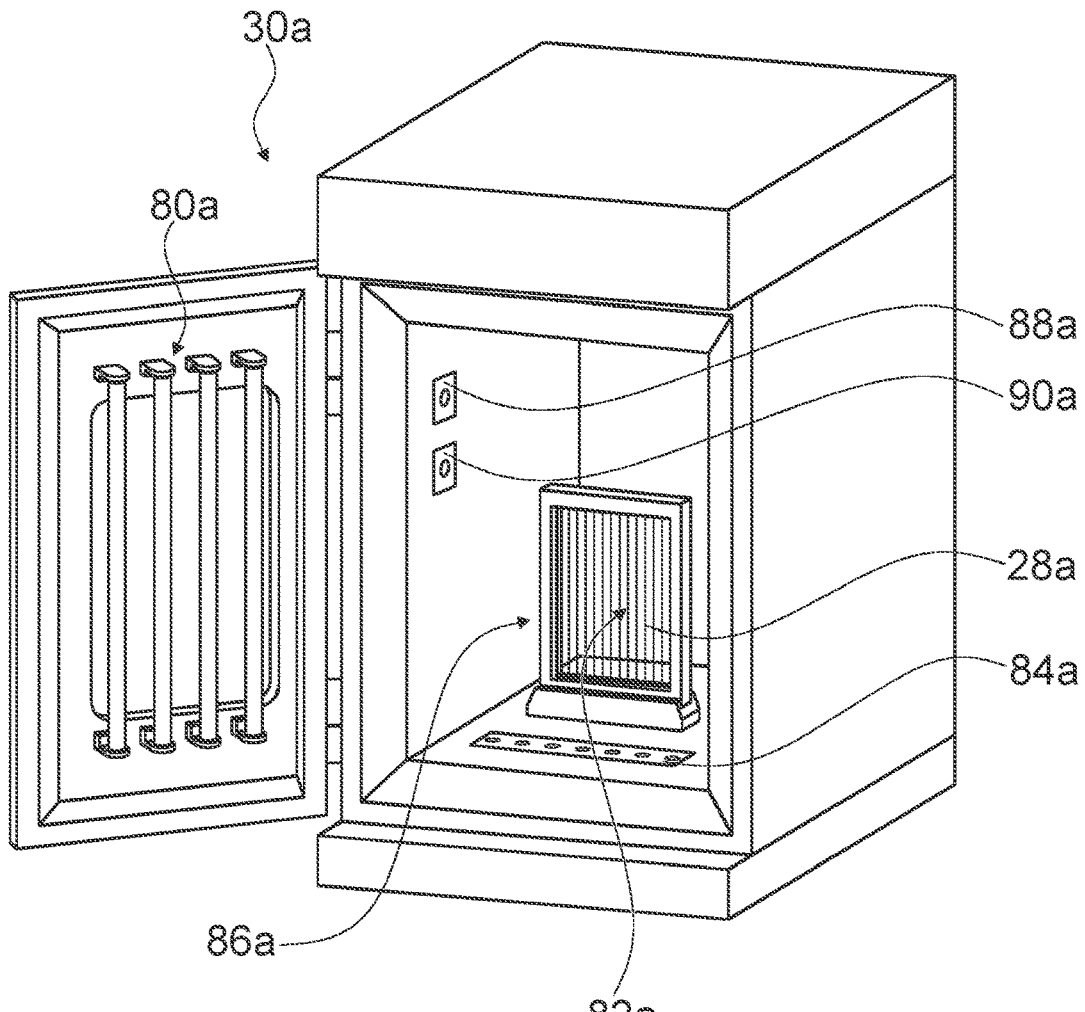
Figure 9:
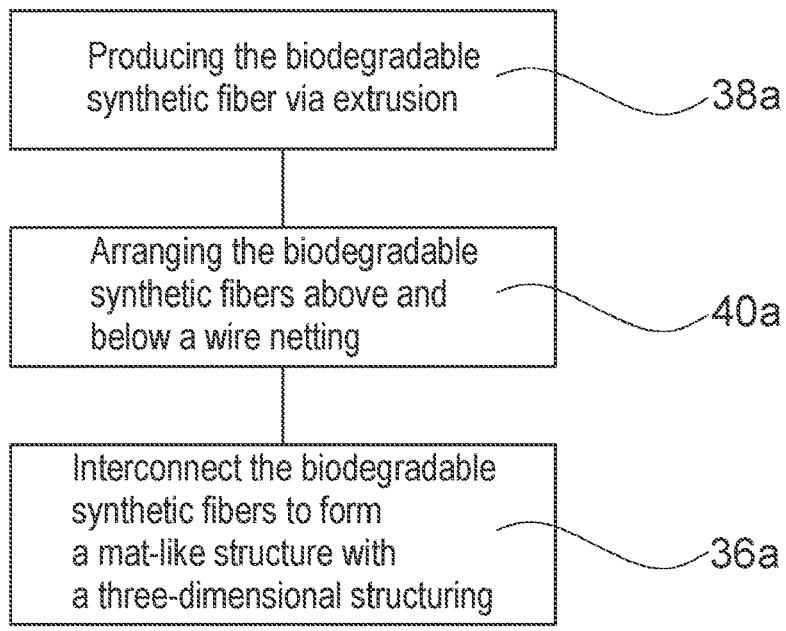
Figure 10:
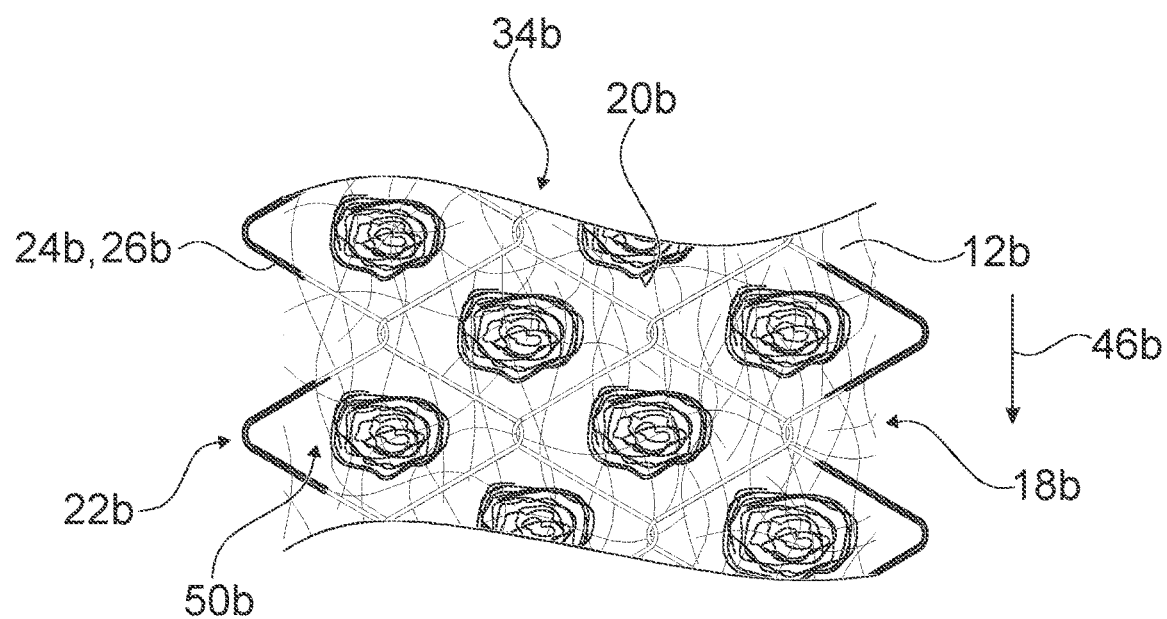
Figure 11:
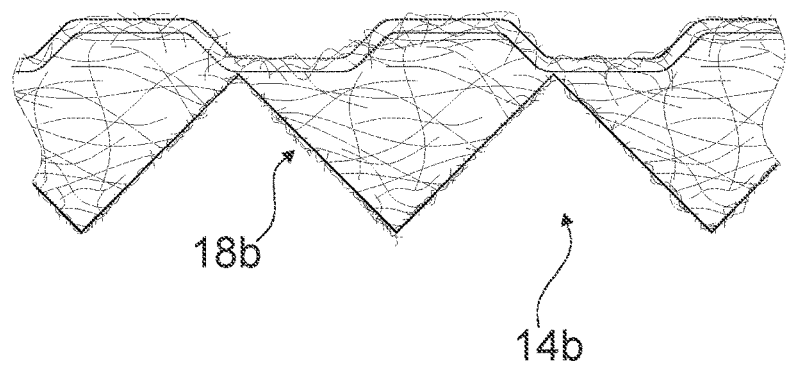

It is shown in:

FIG. 1 a schematic side view of a slope securing with a protective device,

FIG. 2 a schematic top view onto the protective device,

FIG. 3 a schematic side view of the protective device,

FIG. 4 a schematic top view onto the protective device with a wire netting,

FIG. 5 a schematic side view of the protective device with the wire netting,

FIG. 6 a schematic view of a tension test device,

FIG. 7 a flow chart of a tension test trial and an expansion test trial via the tension test device, FIG. 8 a weathering chamber for an execution of a radiation and weathering test, FIG. 9 a flow chart of a method for producing the protective device with the wire netting, FIG. 10 a schematic top view onto an alternative protective device, and FIG. 11 a schematic side view of the alternative protective device.

DESCRIPTION OF THE EXEMPLARY EMBODIMENTS

FIG. 1 shows a sidewise section through a slope securing 32a and the underlying soil and/or stone respectively rock. The slope securing 32a is configured for a securing of a slope against erosion. The slope securing 32a is configured for a securing of the slope against earth slides and/or washing out of slope material. The slope securing 32a comprises a protective device 34a. The protective device 34a is implemented as an anti-erosion protective device. The protective device 34a is implemented as a geotextile. The protective device 34a is configured to be spread planarly over a surface 10a of the slope, which is to be protected. The protective device 34a is configured to planarly cover an earth surface of the slope. The protective device 34a is implemented in the form of panels and is implemented such that it can be rolled for transport. For a covering of the surface 10a which is to be protected, panels of the protective device 34a are rolled out on the surface 10a, are interconnected at the side edges of individual panels and are spread and fixated on the surface 10a which is to be protected by means of tensioning ropes and anchoring elements 42a. The protective device 34a forms a spike mat.

The slope securing 32a comprises at least one anchoring element 42a. The anchoring element 42a is implemented as a soil nail and/or rock nail. The anchoring element 42a is configured for a position-fix fastening of the protective device 34a on the surface 10a of the slope. For a fixation of the protective device 34a, the anchoring element 42a is inserted, in particular by drilling or hammering, into the soil and/or rock of the slope in a perpendicular or inclined fashion. The anchoring element 42a comprises at least one anchor plate 44a. The anchor plate 44a may be implemented integrally with the anchoring element 42a, for example as a nail head, or separately from the anchoring element 42a, for example as a spike plate. The anchor plate 44a is configured to transfer a holding force of the anchoring element 42a at least onto the protective device 34a. The slope securing 32a comprises a plurality of anchoring elements 42a, which are distributed over the entire surface of the protective device 34a at regular or irregular distances, wherein the dimension of the distances depends on a character of the slope (topography and geology).

The protective device 34a is configured at least for a usage with a seeding and/or a re-seeding of the slope-situated and thus erosion-prone surface 10a.

FIG. 2 shows a section of a top view onto the protective device 34a. The protective device 34a is implemented at least largely of a plurality of synthetic fibers 12a. The synthetic fibers 12a are interconnected by force-fit connection and/or by substance-to-substance bond. At least a large portion of the synthetic fibers 12a of the plurality of synthetic fibers 12a is at least largely biodegradable. The synthetic fibers 12a are arranged randomly relative to one another. The synthetic fibers 12a are implemented at least partly as continuous fibers. The synthetic fibers 12a are implemented at least partly as staple fibers with a maximum length of 20 cm. The synthetic fibers 12a extend in all three spatial directions. The synthetic fibers 12a are implemented filament-like. The synthetic fibers 12a form monofilaments. The synthetic fibers 12a have diameters between 0.15 mm and 0.4 mm. The synthetic fibers 12a are hydrophobic.

In a composting test, the biodegradable synthetic fiber 12a and/or a test fiber piece 28a (cf. also FIG. 6 or FIG. 8) of the biodegradable synthetic fiber 12a is biologically decomposed by at least 10% after a 2-year period. In a composting test, the biodegradable synthetic fiber 12a and/or the test fiber piece 28a of the biodegradable synthetic fiber 12a has biologically decomposed or disintegrated by maximally 10% after a 0.5-year period. The synthetic fibers 12a have, at least in an as-good-as-new state, an average strength that is higher than 70 MPa. The synthetic fibers 12a have, at least in the as-good-as-new state, an average stretchability that is higher than 500%. The synthetic fibers 12a are thermoplastically deformable, at least in the as-good-as-new state.

At least a portion of the synthetic fibers 12a are implemented at least partially of a polylactide synthetic material (PLA). At least a portion of the synthetic fibers 12a are implemented at least partially of a biodegradable synthetic material which differs from a polylactide synthetic material. For example, the synthetic fibers 12a are implemented at least partly of a polyhydroxy butyric acid (PHBV), a polycaprolactone (PCL), a polybutylene succinate (PBS) and/or a polybutylene adipate-terephthalate (PBAT). At least a portion of the synthetic fibers 12a are implemented at least partly of a spinnable blend of at least two biodegradable synthetic materials. At least one component of the spinnable blend is realized as a polylactide synthetic material. A volume percentage of the polylactide synthetic material (PLA) in the synthetic fibers 12a implemented of the spinnable blend is at least 40%. Alternatively or additionally, at least a portion of the synthetic fibers 12a are implemented as viscose fibers.

FIG. 3 shows a side view of the protective device 34a. The protective device 34a has an essential three-dimensional structuring 14a. The side view of FIG. 3 shows the protective device 34a from an arbitrary viewing direction. The synthetic fibers 12a are arranged relative to one another such that they form the essential three-dimensional structuring 14a. The protective device 34a has an extension perpendicularly to a main extension plane of the protective device 34a that is at least 1 cm. The synthetic fibers 12a form a random-fiber fabric 16a. The random-fiber fabric 16a is implemented as a three-dimensional random-fiber fabric 16a. The random-fiber fabric 16a is realized as a monofilament random-fiber fabric 16a. The synthetic fibers 12a provide the protective device 34a with a monofilament random-fiber fabric structure. The random-fiber fabric 16a, in particular the monofilament random-fiber fabric structure, comprises a plurality of hollow spaces between the individual synthetic fibers 12a (monofilaments). The random-fiber fabric 16a has a void ratio of more than 90%. The random-fiber fabric 16a has an area density of less than 700 g/m², preferably less than 500 g/m². The hollow spaces are configured at least for receiving plant seeds. The random-fiber fabric 16a is implemented such that the synthetic fibers 12a of the random-fiber fabric 16a form an especially large surface area. The surface of the random-fiber fabric 16a is configured to favor a formation of dewdrops. The synthetic fibers 12a of the random-fiber fabric 16a are oriented randomly. The synthetic fibers 12a of the random-fiber fabric 16a are distributed randomly. The synthetic fibers 12a of the random-fiber fabric 16a are oriented unevenly. The synthetic fibers 12a of the random-fiber fabric 16a are distributed unevenly.

It is in particular pointed out that FIGS. 2 to 5 are schematic, exemplary representations, which means, in particular, that precise arrangements of synthetic fibers 12a within a random-fiber fabric 16a or regularities in the depicted arrangements of the synthetic fibers 12a are due to graphic conditions and do not necessarily correspond to real arrangements of synthetic fibers 12a in a random-fiber fabric 16a.

FIG. 4 shows a section of a top view onto the protective device 34a with a wire netting 22a worked into the random-fiber fabric 16a of synthetic fibers 12a. The protective device 34a comprises the wire netting 22a. The wire netting 22a is realized as a wire mesh netting. The wire netting 22a is implemented of a plurality of helix-shaped longitudinal elements 24a which are braided with one another. The longitudinal elements 24a are implemented of a wire 26a. In the present case the wire 26a has a diameter of 2 mm. It is also conceivable that a longitudinal element 24a is embodied as a wire bundle, as a wire strand, as a wire rope, or the like. It is furthermore conceivable that a wire 26a has a different diameter, like for example less than 1 mm or approximately 1 mm or approximately 2 mm or approximately 4 mm or approximately 5 mm or approximately 6 mm or an even greater diameter. The wire 26a is implemented at least partly of a high-tensile steel. The wire 26a has a tensile strength of at least 500 N mm$^{-2}$. In the present case the wire 26a has a tensile strength of at least 1770 N mm$^{-2}$. Of course, as has been mentioned above, other tensile strengths are also conceivable, in particular also tensile strengths exceeding 2200 N mm$^{-2}$. In particular, it is conceivable that the wire 26a is produced of ultra-high-tensile steel. The wire netting has a total tensile strength of at least 53 kN/m.

The longitudinal elements 24a comprise something like an anti-corrosion coating. The anti-corrosion coating is realized as a Zn/Al coating. The wire 26a with the anti-corrosion coating constitutes a Class A wire. The longitudinal elements 24a have a shape of a flattened spiral. The longitudinal elements 24a have a longitudinal extension direction 46a. The longitudinal elements 24a are hooked with one another in a direction that is perpendicular to the longitudinal extension direction 46a. The longitudinal elements 24a, which are hooked with one another and/or braided with one another, are entwined into one another. The longitudinal elements 24a of the wire netting 22a, which are braided with one another, form rhomboid meshes 50a. The rhomboid meshes 50a of the wire netting 22a have measurements of 101 mm 175 mm. Meshes 50a with greater or smaller measurements are of course also conceivable. The wire netting 22a can be rolled up in a direction that is perpendicular to the longitudinal extension direction 46a.

The wire netting 22a is surrounded by synthetic fibers 12a. The wire netting 22a is braided with the synthetic fibers 12a. The wire netting 22a is wrapped around with the synthetic fibers 12a. The wire netting 22a has been worked into the random-fiber fabric 16a. Synthetic fibers 12a are arranged beneath and above the wire netting 22a. The random-fiber fabric 16a is laid around the wire netting 22a. The wire netting 22a is not removable out of the random-fiber fabric 16a without destruction. At least a portion of the synthetic fibers 12a is connected with the wire netting 22a by substance-to-substance bond. For the substance-to-substance bond of the synthetic fibers 12a with the wire netting 22a, the synthetic fibers 12a are at least partly molted and/or pressed onto the wire netting 22a.

FIG. 5 shows a side view of the protective device 34a with the wire netting 22a. The side view of FIG. 5 shows the protective device 34a from a viewing direction in parallel to the longitudinal extension direction 46a of the longitudinal element 24a of the wire netting 22a of the protective device 34a. The wire netting 22a has a three-dimensional, mattress-like structure 48a. The mattress-like structure 48a provides the wire netting 22a with a spring capacity in a direction that is perpendicular to a main extension plane of the wire netting 22a. An extension of the wire netting 22a in the direction that is perpendicular to the main extension plane of the wire netting 22a is at least 70%, preferably at least 90% of an extension of the random-fiber fabric 16a in the direction that is perpendicular to the main extension plane of the wire netting 22a. The extension of the wire netting 22a in the direction that is perpendicular to the main extension plane of the wire netting 22a is at least a four-fold, preferably at least a six-fold, of a diameter of the wire 26a of the wire netting 22a.

FIG. 6 shows a schematic view of a tension test device 52a. The tension test device 52a is configured for an execution of a tension test trial. The tension test device 52a also serves as an expansion test device. The expansion test device is configured for an execution of an expansion test trial. The tension test device 52a comprises at least two pairs of clamping jaws 54a. The clamping jaws 54a are pneumatically closable and/or openable. The clamping jaws 54a are configured for a pinching and/or clamping-in of test fiber pieces 28a. The clamping jaws 54a are fixated on holding elements 56a, 58a of the tension test device 52a. At least one upper holding element 56a is supported such that it is vertically traversable along a tower 60a of the tension test device 52a.

The test fiber piece 28a is implemented identically to a synthetic fiber 12a of a protective device 34a. Test fiber pieces 28a have a diameter that is at least substantially identical to a diameter of the synthetic fibers 12a. Test fiber pieces 28a have a material composition that is at least substantially identical to a material composition of the synthetic fibers 12a. The test fiber piece 28a is at least substantially straight.

For an execution of the tension test, the clamping jaws 54a are movable apart from each other in a motorically driven manner. The movement of the clamping jaws 54a is herein effected linearly in a direction that runs at least substantially parallel to a longitudinal direction of the clamped-in test fiber piece 28a. The tension test device 52a comprises at least one force sensor element 62a. The force sensor element 62a is configured for sensing the strength of the test fiber piece 28a. The force sensor element 62a is configured for sensing a tension force which acts onto the test fiber piece 28a. The tension test device 52a comprises at least one distance sensor element 64a. The distance sensor element 64a is configured for sensing a maximum stretching distance of the test fiber piece 28a until breaking of the test fiber piece 28a. The distance sensor element 64a is configured, in an interaction with the force sensor element 62a, for a sensing of a stretchability of the test fiber piece 28a. The distance sensor element 64a is in particular embodied as an optical distance sensor, for example as a camera.

Alternatively, the distance sensor element 64a may, for example, be implemented as a measuring device of a spindle or of a stepper motor, which detects a traversing path covered by the spindle or by the stepper motor.

FIG. 7 shows a flow chart of a tension test trial and an expansion test trial, in particular of a method for measuring the strength and/or the stretchability of a test fiber piece 28a. In at least one method step 66a the test fiber piece 28a is newly produced or is taken from a newly produced protective device 34a. In at least one further method step 68a a diameter of the test fiber piece 28a is determined by measuring. In at least one further method step 70a the test fiber piece 28a is clamped into the clamping jaws 54a of the tension test device 52a. In at least one further method step 72a the clamping jaws 54a are moved apart from each other in a controlled manner, in particular with a velocity of 20 mm/min, as a result of which the test fiber piece 28a is stretched and is subjected to a tension load. While the test fiber piece 28a is being pulled apart, the tension forces occurring in the test fiber piece 28a are captured and recorded by the force sensor element 62a. In at least one further method step 74a the moving apart of the clamping jaws 54a is stopped. The moving apart of the clamping jaws 54a is stopped as soon as a breaking of the test fiber piece 28a is detected, for example via the force sensor element 62a by an abrupt decrease of the tension force measured. In at least one further method step 76a the distance covered by the clamping jaws 54a before a breaking of the test fiber piece 28a is measured by the distance sensor element 64a. A stretchability of the test fiber piece 28a is calculated by a comparison with an initial distance of the clamping jaws 54a. In at least one further method step 78a the strength of the test fiber piece 28a is determined by the force sensor element 62a on the basis of the maximum measured tension force before a breaking of the test fiber piece 28a.

In the tension test trial, the test fiber piece 28a presents a strength of more than 70 MPa, preferably more than 80 MPa. In the expansion test trial, the test fiber piece 28a presents a stretchability of more than 500%, preferably more than 600%. The random-fiber fabric 16a is implemented of synthetic fibers 12a, which are at least substantially identical to the test fiber piece 28a and thus have the same strengths and stretchabilities in the non-weathered state.

FIG. 8 shows a weathering chamber 30a. The weathering chamber 30a is configured for an execution of a radiation and weathering test. The weathering chamber 30a comprises at least one holding device 86a, which is configured for a holding, in particular for a clamping-in, of at least one test fiber piece 28a and/or at least one test fiber bundle piece 82a. The weathering chamber 30a comprises at least one radiation unit 80a. The radiation unit 80a is configured for a radiation of a test fiber piece 28a or a test fiber bundle piece 82a, which is accommodated in the weathering chamber 30a, preferably clamped in the holding device 86a, with UV light. The UV light has a spectrum that is similar to the UV component of daylight. The radiation unit 80a comprises at least one xenon lamp. The weathering chamber 30a comprises at least one spray unit 84a. The spray unit 84a is configured for a cyclic spraying of a test fiber piece 28a or test fiber bundle piece 82a, which is accommodated in the weathering chamber 30, preferably clamped in the holding device 86a, with spray water. The spray water is in particular, depending on a type of the weathering, deionized water, rainwater-like fresh water or seawater-like salt water. The weathering chamber 30a moreover comprises a temperature sensor 88a for a determination of a weathering chamber temperature and/or a black standard temperature of the test fiber piece 28a and/or of the test fiber bundle piece 82a. Furthermore, the weathering chamber 30a comprises a humidity sensor 90a for a determination of a relative humidity within the weathering chamber 30a. The weathering chamber 30a comprises a control and/or regulation unit (not shown), which is at least configured to control and/or regulate the spray unit 84a and the radiation unit 80a, and to set at least the weathering chamber temperature and the relative humidity in the weathering chamber 30a. The weathering chamber 30a is configured for an execution of a radiation and weathering test in accordance with the requirements of Procedure A, Cycle 1 of the standard DIN EN ISO 4892-2:2013-06.

Having gone through a 500-hour radiation and weathering test in the weathering chamber 30a, in which the test fiber piece 28a and/or the test fiber bundle piece 82a are/is exposed at least cyclically at least to a radiation with UV light and at least to a weathering by spray water, the test fiber piece 28a and/or the test fiber bundle piece 82a have/has in the tension test trial by means of the tension test device 52a a remaining strength amounting to at least 66% of an initial strength of the test fiber piece 28a and/or the test fiber bundle piece 82a in a non-weathered state. Having gone through the 500-hour radiation and weathering test in the weathering chamber 30a, in which the test fiber piece 28a is exposed at least cyclically at least to a radiation with UV light and at least to a weathering with water, the test fiber piece 28a and/or the test fiber bundle piece 82a have/has in the expansion test a remaining stretchability of at least 50% of an initial stretchability of the test fiber piece 28a and/or of the test fiber bundle piece 82a in a non-weathered state. The random-fiber fabric 16a is implemented of synthetic fibers 12a, which are at least substantially identical to the test fiber piece 28a and/or the test fiber bundle piece 82a and will therefore have the same strengths and stretchabilities in the weathered state.

FIG. 9 shows a flow chart of a method for producing the protective device 34a with the wire netting 22a. In at least one method step 38a biodegradable synthetic fibers 12a are produced via extrusion. In a further method step 40a randomly-oriented biodegradable synthetic fibers 12a are arranged layer-wise above and below a wire netting 22a in such a way that, in a structuring step 36a following the method step 40a, the wire netting 22a is braided with the synthetic fibers 12a. In the structuring step 36a, at least largely biodegradable synthetic fibers 12a, which are initially implemented separately from one another, are interconnected by force-fit connection and/or substance-to-substance bond in such a way that the at least largely biodegradable synthetic fibers 12a form a mat-like structure with an essentially three-dimensional structuring 14a.

In FIGS. 10 and 11 a further exemplary embodiment of the invention is illustrated. The following description and the drawings are substantially limited to the differences between the exemplary embodiments wherein principally, regarding identically denominated components, in particular regarding components having the same reference numerals, the drawings and/or the description of the other exemplary embodiment, in particular of FIGS. 1 to 9, may be referred to. In order to distinguish between the exemplary embodiments, the letter a has been added to the reference numerals of the exemplary embodiment of FIGS. 1 to 9. In the exemplary embodiment of FIGS. 10 and 11 the letter a has been substituted by the letter b.

FIG. 10 shows a top view of an alternative protective device 34b and FIG. 11 shows a side view of the alternative protective device 34b. The side view of FIG. 11 shows the protective device 34b from a viewing direction that is perpendicular to a longitudinal extension direction 46b of a longitudinal element 24b of a wire netting 22b of the protective device 34b. The protective device 34b is largely implemented of a plurality of synthetic fibers 12b, which are interconnected by force-fit connection and/or by substance-to-substance bond. The synthetic fibers 12b are implemented as regenerate fibers. The synthetic fibers 12b are implemented as viscose fibers. The synthetic fibers 12b are arranged in such a way that they form an essentially three-dimensional structuring 14b. The synthetic fibers 12b form a nonwoven-like structure 18b. The nonwoven-like structure 18b is substantially free of hollow spaces. The nonwoven-like structure 18b is opaque but water-permeable. The nonwoven-like structure 18b has a filter effect for liquids. The nonwoven-like structure 18b forms a three-dimensionally structured, closed surface plane 20b. The nonwoven-like structure 18b is egg-carton-shaped. The three-dimensionally structured surface plane 20b is configured to increase a slide friction with a ground. Deepenings in the nonwoven-like structure 18b are configured for receiving plant seeds.

REFERENCE NUMERALS 10 surface
12 synthetic fiber
14 three-dimensional structuring
16 random-fiber fabric
18 nonwoven-like structure
20 surface plane
22 wire netting
24 longitudinal element
26 wire
28 test fiber piece
30 weathering chamber
32 slope securing
34 protective device
36 structuring step
38 method step
40 method step
42 anchoring element
44 anchor plate
46 longitudinal extension direction
48 mattress-like structure
50 mesh
52 tension-test device
54 clamping jaws
56 holding element
58 holding element
60 tower
62 force sensor element
64 distance sensor element
66 method step
68 method step
70 method step
72 method step
74 method step
76 method step
78 method step
80 irradiation unit
82 test fiber bundle piece
84 spray unit
86 holding device
88 temperature sensor
90 humidity sensor

The invention claimed is:

1. A protective device which is at least configured to be planarly spread over a surface, that is to be protected, and which is at least largely implemented of a plurality of synthetic fibers interconnected via force-fit connection and/or substance-to-substance bond and arranged in such a way that they form an essentially three-dimensional structuring, wherein at least a large portion of the synthetic fibers are at least largely biodegradable, wherein the synthetic fibers are polymer fibers and wherein the synthetic fibers form a three-dimensional random-fiber fabric having hollow spaces between a large portion of the synthetic fibers, wherein the synthetic fiber of the protective device presents a tension strength that is greater than 70 MPa, wherein when the synthetic fiber of the protective device has gone through an at least 500-hour radiation and weathering test in a weathering chamber, in which the synthetic fiber of the protective device has been subjected at least cyclically at least to a UV-light radiation and at least to a weathering by spray water, the synthetic fiber of the protective device presents a remaining tension strength of at least 66% of an initial strength of the synthetic fiber of the protective device in a non-weathered state.

2. The protective device according to claim 1, wherein at least a portion of the synthetic fibers are implemented at least partially of a polylactide synthetic material (PLA).

3. The protective device according to claim 1, wherein at least a portion of the synthetic fibers are implemented at least partially of a biodegradable synthetic material which differs from a polylactide synthetic material.

4. The protective device according to claim 1, wherein at least a portion of the synthetic fibers are implemented at least partially of a spinnable blend of at least two biodegradable synthetic materials.

5. The protective device according to claim 4, wherein at least one component of the spinnable blend is realized as a polylactide synthetic material, wherein a volume percentage of the polylactide synthetic material of the synthetic fibers implemented of the spinnable blend is at least 40%.

6. The protective device according to claim 1, wherein at least a portion of the synthetic fibers are thermoplastically deformable.

7. The protective device according to claim 1, wherein the synthetic fibers form a monofilament, random-fiber fabric.

8. The protective device according to claim 1, wherein the synthetic fibers realize a nonwoven-material-like structure, which forms a three-dimensionally structured, closed surface plane.

9. The protective device according to claim 1, further comprising a wire netting.

10. The protective device according to claim 9, wherein the wire netting is implemented at least of helix-shaped longitudinal elements, which are braided with one another.

11. The protective device according to claim 9, wherein the wire netting is braided with the synthetic fibers.

12. The protective device according to claim 11, wherein at least a portion of the synthetic fibers are connected with the wire netting by substance-to-substance bond.

13. The protective device according to claim 9, wherein the wire netting has a three-dimensional, mattress-like structure.

14. The protective device according to one of claim 9, wherein the wire netting comprises at least one wire which is implemented at least partly of a high-tensile steel.

15. The protective device according to claim 1, wherein the synthetic fiber of the protective device presents a stretchability above 500%.

16. The protective device according to claim 15, wherein, having gone through the at least 500-hour radiation and weathering test in the weathering chamber, in which the synthetic fiber of the protective device is exposed at least cyclically at least to the UV-light radiation and at least to the weathering by water, the synthetic fiber of the protective device presents in the expansion test a residual stretchability of at least 50% of an initial stretchability of the synthetic fiber of the protective device in the non-weathered state.

17. The protective device according to claim 1, wherein at least 10% of the synthetic fiber of the protective device biologically decomposes after a 2-year period.

18. The protective device according to claim 1, wherein maximally 10% of the synthetic fiber of the protective device biologically decomposes or disintegrates after a period of 0.5 years.

19. A slope securing with a protective device according to claim 1.

20. A usage of the protective device according to claim 1 with a seeding and/or a re-seeding of a slope-situated and/or erosion-prone, surface.

21. A method for producing a protective device according to claim 1, comprising
providing synthetic fibers separately from one another, the synthetic fibers being biodegradable, and
connecting the synthetic fibers to one another by force-fit connection and/or substance-to-substance bond such that the at least largely biodegradable synthetic fibers form a mat-like structure with an essentially three-dimensional structuring.

22. The method according to claim 21, further comprising at least one further method step that precedes the structuring step, of arranging the at least largely biodegradable, randomly-oriented synthetic fibers layer-wise above and underneath a wire netting, and
the structuring step includes braiding the wire netting with the synthetic fibers.

23. A protective device which is at least configured to be planarly spread over a surface, that is to be protected, and which is at least largely implemented of a plurality of synthetic fibers interconnected via force-fit connection and/or substance-to-substance bond and arranged in such a way that they form an essentially three-dimensional structuring, wherein at least a large portion of the synthetic fibers are at least largely biodegradable, wherein the synthetic fibers are polymer fibers and wherein the synthetic fibers form a three-dimensional random-fiber fabric having hollow spaces between a large portion of the synthetic fibers, wherein the synthetic fiber of the protective device presents a stretchability above 500%, wherein, having gone through an at least 500-hour radiation and weathering test in a weathering chamber, in which the synthetic fiber of the protective device is exposed at least cyclically at least to a UV-light radiation and at least to a weathering by water, the synthetic fiber of the protective device presents in the expansion test a residual stretchability of at least 50% of an initial stretchability of the synthetic fiber of the protective device in a non-weathered state.

24. A protective device which is at least configured to be planarly spread over a surface, that is to be protected, and which is at least largely implemented of a plurality of synthetic fibers interconnected via force-fit connection and/or substance-to-substance bond and arranged in such a way that they form an essentially three-dimensional structuring, wherein at least a large portion of the synthetic fibers are at least largely biodegradable, wherein the synthetic fibers are polymer fibers and wherein the synthetic fibers form a three-dimensional random-fiber fabric having hollow spaces between a large portion of the synthetic fibers, further comprising a wire netting,
wherein the wire netting
is implemented at least of helix-shaped longitudinal elements, which are braided with one another, and/or
comprises at least one wire which is implemented at least partly of a high-tensile steel.

25. The protective device according to claim 24, wherein the wire netting is braided with the synthetic fibers.

26. The protective device according to claim 25, wherein at least a portion of the synthetic fibers are connected with the wire netting by substance-to-substance bond.

27. The protective device according to claim 24, wherein the wire netting has a three-dimensional, mattress-like structure.

\* \* \* \* \*